US006984631B2

(12) United States Patent
Aranishi et al.

(10) Patent No.: US 6,984,631 B2
(45) Date of Patent: Jan. 10, 2006

(54) THERMOPLASTIC CELLULOSE DERIVATIVE COMPOSITION AND FIBER COMPRISING THE SAME

(75) Inventors: Yoshitaka Aranishi, Mishima (JP); Hiroyuki Yamada, Mishima (JP); Yuuhei Maeda, Mishima (JP); Hiroshi Takahashi, Mishima (JP); Misa Ozaki, Mishima (JP); Yoshiyuki Nishio, Kyoto (JP); Mariko Yoshioka, Kyoto (JP)

(73) Assignee: Toray Industries, Inc., (JP)

( * ) Notice: Subject to any disclaimer, the term of this patent is extended or adjusted under 35 U.S.C. 154(b) by 0 days.

(21) Appl. No.: 10/432,191

(22) PCT Filed: Jun. 25, 2002

(86) PCT No.: PCT/JP02/06336

§ 371 (c)(1),
(2), (4) Date: May 20, 2003

(87) PCT Pub. No.: WO03/000966

PCT Pub. Date: Jan. 3, 2003

(65) Prior Publication Data

US 2004/0030043 A1    Feb. 12, 2004

(30) Foreign Application Priority Data

| Jun. 26, 2001 | (JP) | ............................. 2001-193179 |
| Sep. 6, 2001 | (JP) | ............................. 2001-270381 |
| Feb. 26, 2002 | (JP) | ............................. 2002-049627 |

(51) Int. Cl.
*A61K 31/715*    (2006.01)
*A01N 43/04*    (2006.01)
*C07H 1/00*    (2006.01)
*D06M 13/00*    (2006.01)

(52) U.S. Cl. .................. 514/57; 536/124; 8/115.51; 8/129; 8/130.1; 8/131

(58) Field of Classification Search ................. 514/57; 536/124; 8/115.51, 130.1, 129, 131
See application file for complete search history.

(56) References Cited

U.S. PATENT DOCUMENTS

| 3,637,447 A | * | 1/1972 | Berger et al. ................ 156/180 |
| 4,276,173 A | | 6/1981 | Kell et al. |
| 5,480,922 A | | 1/1996 | Mülhaupt et al. |
| 5,783,505 A | * | 7/1998 | Duckett et al. .............. 442/411 |
| 5,970,988 A | * | 10/1999 | Buchanan et al. .......... 131/332 |

FOREIGN PATENT DOCUMENTS

| DE | 44 28 211 A1 | 2/1996 |
| EP | 0 732 341 A2 | 9/1996 |
| EP | 0 732 341 A3 | 9/1996 |
| GB | 2152944 A * | 8/1985 |

(Continued)

*Primary Examiner*—James O. Wilson
*Assistant Examiner*—Everett White
(74) *Attorney, Agent, or Firm*—DLA Piper Rudnick Gray Cary US LLP

(57) ABSTRACT

A thermoplastic cellulose derivative composition of the present invention contains, as a main component, a cellulose ester having an aliphatic polyester side chain having a repeat unit having 2 to 5 carbon atoms, wherein a rate of heating loss at 200° C. is 5 wt % or less, a melt viscosity at 200° C. and 1000 sec$^{-1}$ is 50 to 300 Pa·sec, and a melt tension at the time of take-up at 200° C. and 100 m/min is 0.1 to 40 mN. The present invention can provide excellent fiber products by melt spinning of the composition.

12 Claims, 2 Drawing Sheets

FOREIGN PATENT DOCUMENTS

| | | |
|---|---|---|
| JP | 54-42420 A | 4/1979 |
| JP | 58-225101 A | 12/1983 |
| JP | 59-86621 A | 5/1984 |
| JP | 60-155710 A | 8/1985 |
| JP | 6-287279 A | 10/1994 |
| JP | 7-179662 A | 7/1995 |
| JP | 09-78339 A | 3/1997 |
| JP | 09-291414 A | 11/1997 |
| JP | 10317228 A * | 12/1998 |
| JP | 11-71402 A | 3/1999 |
| JP | 11071402 A * | 3/1999 |
| JP | 11-506175 W | 6/1999 |
| JP | 11-240942 A | 9/1999 |
| JP | 11-255801 A | 9/1999 |

* cited by examiner

US 6,984,631 B2

THERMOPLASTIC CELLULOSE DERIVATIVE COMPOSITION AND FIBER COMPRISING THE SAME

TECHNICAL FIELD

The present invention relates to a thermoplastic cellulose derivative composition having good thermal fluidity and capable of melt spinning, fibers comprising the composition, and a method of producing the fibers. More specifically, the present invention relates to a cellulose ester composition having, for example, aliphatic polyester side chains, and fibers comprising the composition or fibers comprising a cellulose mixed ester composition containing a plasticizer, and a method of producing fibers by converging filaments and then taking up them with a low tensile force.

BACKGROUND ART

In recent years, cellulose materials attract great attention as biomass materials which can be produced in the largest quantity on earth, and materials which are biodegradable in the environment. As cellulose fibers, short fibers of cotton and hemp, which are produced in nature, have been used for spinning from old times. General methods for obtaining a filament material, but not short fibers, include a method comprising dissolving cellulose such as rayon, lyocell, or the like in a special solvent system, and then spinning by a wet spinning process, and a method comprising dissolving a cellulose derivative such as cellulose acetate in an organic solvent such as methylene chloride or acetone, and then spinning by a dry spinning process while evaporating the solvent.

However, fibers obtained by the wet spinning process or dry spinning process have the problem of low productivity due to a low spinning rate, and are not necessarily friendly with the environment because organic agents used for producing fibers, such as carbon disulfide, acetone, methylene chloride, and the like, are highly likely to adversely affect the environment. Therefore, a melt spinning process not using an organic agent is necessary for obtaining low-environmental-load fibers using cellulose as a raw material.

Known examples of a thermoplastic cellulose composition capable of melt spinning and fibers comprising the composition include a thermoplastic cellulose composition containing cellulose acetate and a large amount of a water-soluble low-molecular-weight plasticizer such as glycerin or polyethylene glycol added for obtaining hollow yarns having permselectivity, and fibers comprising the composition, as disclosed in Japanese Unexamined Patent Application Publication Nos. 50-46921, 54-42420 and 62-250215. However, as disclosed in , for example, Japanese Unexamined Patent Application Publication No. 62-250215, the content of the low-molecular-weight plasticizer in the composition is as high as 50 to 59% by weight, and thus a heating loss at a spinning temperature is extremely large, thereby deteriorating spinability due to significant evaporation of the plasticizer. Therefore, plasticization of cellulose acetate by adding an external plasticizer has the problem of necessitating adding a large amount of external plasticizer for imparting sufficient plasticity to a composition. Furthermore, these methods are aimed at obtaining hollow yarns having selectivity, and thus the resultant fibers are very thick and have an external diameter of 200 to 300 µm. Therefore, these methods are not techniques for producing fibers having thermal fluidity and spinability enough for use as multifilaments for clothing materials.

Also, known cellulose derivatives used as thermoplastic materials for extrusion molding and injection molding include so-called "acetate plastic compositions" each comprising cellulose acetate plasticized by adding a large amount of low-molecular-weight plasticizer such as dimethyl phthalate or triacetin. These compositions contain 30 to 50% by weight of plasticizer, and have poor melting properties and the problem of producing bleedout of the plasticizer added, and thus the composition cannot be used for melting spinning.

Furthermore, Japanese Unexamined Patent Application Publication Nos. 9-78339, 9-291414, 10-317228 and 11-506175 disclose cellulose acetate compositions plasticized by adding a plasticizer such as a ε-caprolactone derivative, and fibers obtained by melt-spinning the compositions. However, the compositions disclosed in these publications are obtained by a technique for plasticizing cellulose acetate by adding an external plasticizer thereto, and are required to contain a large amount of low-molecular-weight external plasticizer, thereby causing the problem of significantly evaporating the external plasticizer during melt spinning. When a composition contains a large amount of external plasticizer, the external plasticizer is likely to bleed out in a heating step for thermal setting or dyeing and finishing, or in use as a final product.

On the other hand, as an internal plasticization method of effecting direct graft reaction with a cellulose derivative without adding an external plasticizer, a method of producing a polymer by ring-opening graft polymerization of ε-caprolactone as a main material with a cellulose acetate main chain is known (Japanese Unexamined Patent Application Publication Nos. 58-225101, 59-86621, 7-179662, 11-255801, etc.). Although this polymer has no probability of bleedout of a plasticizer, a side chain is mainly composed of polycaprolactone, thereby causing fluidization of the side chain at a temperature of as low as about 60° C. Therefore, the polymer cannot satisfy minimum heat resistance required for fibers.

On the other hand, Japanese Unexamined Patent Application Publication No. 6-287279 discloses a method of producing a cellulose derivative by using, as a graft monomer, a lactide which is a dimer of lactic acid. Cellulose acetate grafted with lactide has no feel of sliminess, but has the problem of deteriorating heat resistance deteriorates, and increasing brittleness when an amount of polylactic acid graft side chains is excessively large. Examples of graft polymers disclosed in the specification of Japanese Unexamined Patent Application Publication No. 6-287279 are obtained by using 900 to 4900 wt % of L-lactide for cellulose acetate, and the resultant polymer compositions have extremely low melt viscosity at 200° C. These polymer compositions have the problem of deteriorating spinning performance because of an excessively low nozzle back pressure in melt spinning of the compositions.

Japanese Unexamined Patent Application Publication No. 11-240942 discloses a mixed composition comprising a cellulose ester or a cellulose ether grafted with lactide, and a plasticizer. However, this composition contains the low molecular-weight plasticizer, and thus has the problem of bleedout of the plasticizer during use of products.

With respect to a method of producing fibers by melt spinning, Japanese Unexamined Patent Application Publication Nos. 9-78339, 9-291414, 10-317228 and 11-506175 disclose techniques of melt-spinning cellulose acetate plasticized with a ε caprolactone derivative, or the like. However, these methods are production methods using high-speed air, and thus easily cause variations in the take-up speed with variations in air pressure, thereby increasing size irregularity of the obtained fibers. Therefore, the methods are not yet satisfactory spinning methods in view of application to clothing fibers. Furthermore, the methods are methods of "stretching and filamentation by using high-speed air, and then winding, or filamentation and then volume collection on a collecting support surface to form a web". In these methods, convergence is not performed in a spinning step because filamentation is performed after spinning. Therefore, when the spinning rate is high, or a single yarn has a small size, spinning tension applied to fibers is liable to increase, thereby easily causing the problem of causing troubles such as yarn breakage and single yarn flow in a process. Furthermore, when a yarn is supplied from a package of a wound yarn to a higher processing apparatus such as a drawing machine, a weaving machine, a knitting machine, or the like, there is the problem of insufficient releasability. Also, since the winding method uses high-speed air, the winding speed easily varies with variations in the air pressure, thereby increasing size irregularity of the obtained fibers. Therefore, the fibers are not said to be suitable for clothing fibers.

Therefore, a cellulose derivative composition capable of melt spinning with high efficiency and causing no evaporation of a plasticizer has not yet been known, and there has been no method of providing cellulose derivative composition fibers having good mechanical properties and uniformity by melt spinning.

DISCLOSURE OF INVENTION

A thermoplastic cellulose derivative composition and fibers comprising the composition are composed of a cellulose ester as a main component, which has an aliphatic polyester side chain having a repeat unit having 2 to 5 carbon atoms, wherein a heating loss at 200° C. is 5 wt % or less, a melt viscosity determined at 200° C. and at a shear rate of 1000 sec$^{-1}$ is 50 to 300 Pa·sec, and a melt tension at the time of take-up at 200° C. and 100 m/min is 0.1 to 40 mN. The thermoplastic cellulose derivative composition has excellent heat resistance, thermal fluidity, and spinability, and is capable of melt spinning.

Furthermore, a method of producing a fiber comprising a thermoplastic cellulose derivative composition of the present invention comprises spinning a thermoplastic cellulose derivative composition, having a melt viscosity determined at 200° C. and at a shear rate of 1000 sec$^{-1}$ of 50 to 300 Pa·sec, and a melt tension of 0.1 to 40 mN at the time of take-up at 200° C. and 100 m/min, at a melting temperature of 180° C. to 240° C., converging the resulting fibers with an oiling agent or water applied at a distance of 0.5 to 5 m from the bottom of a nozzle, taking up the resultant yarn by a godet roller under a spinning tension of 0.1 to 3.0 mN/dtex, and then winding the yarn on a package. The thermoplastic cellulose composition fibers have excellent fiber uniformity and releasability.

In another aspect of the present invention, a fiber comprising a thermoplastic cellulose derivative composition is obtained by melt-spinning a thermoplastic cellulose mixed ester composition comprising 85 to 98% by weight of a cellulose mixed ester, and 1 to 30% by weight of a plasticizer having a molecular weight of 350 to 20,000, and has good mechanical properties and uniformity.

REFERENCE NUMERALS

Figure 1:
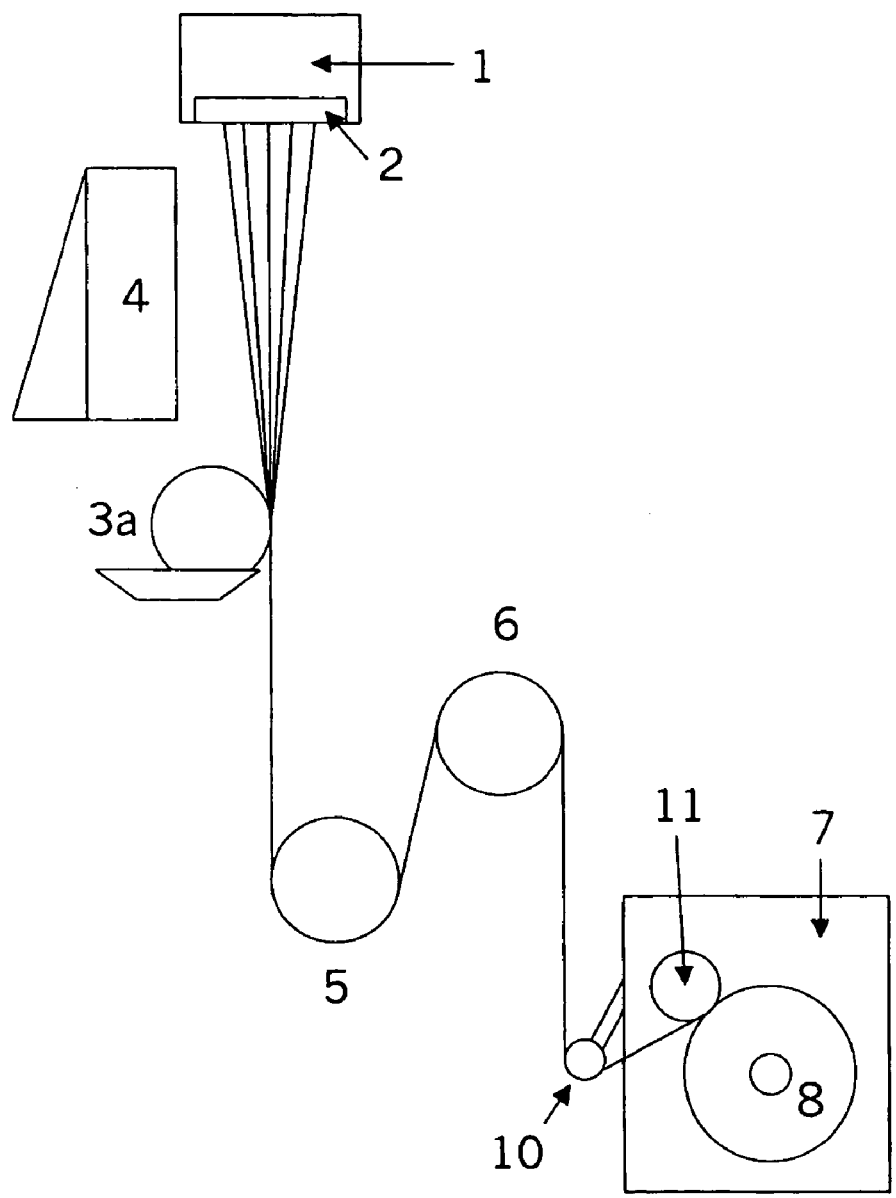
FIG. 1 is a schematic drawing showing an example of steps of a method of producing fibers comprising a thermoplastic cellulose derivative composition according to an embodiment of the present invention.
Figure 2:
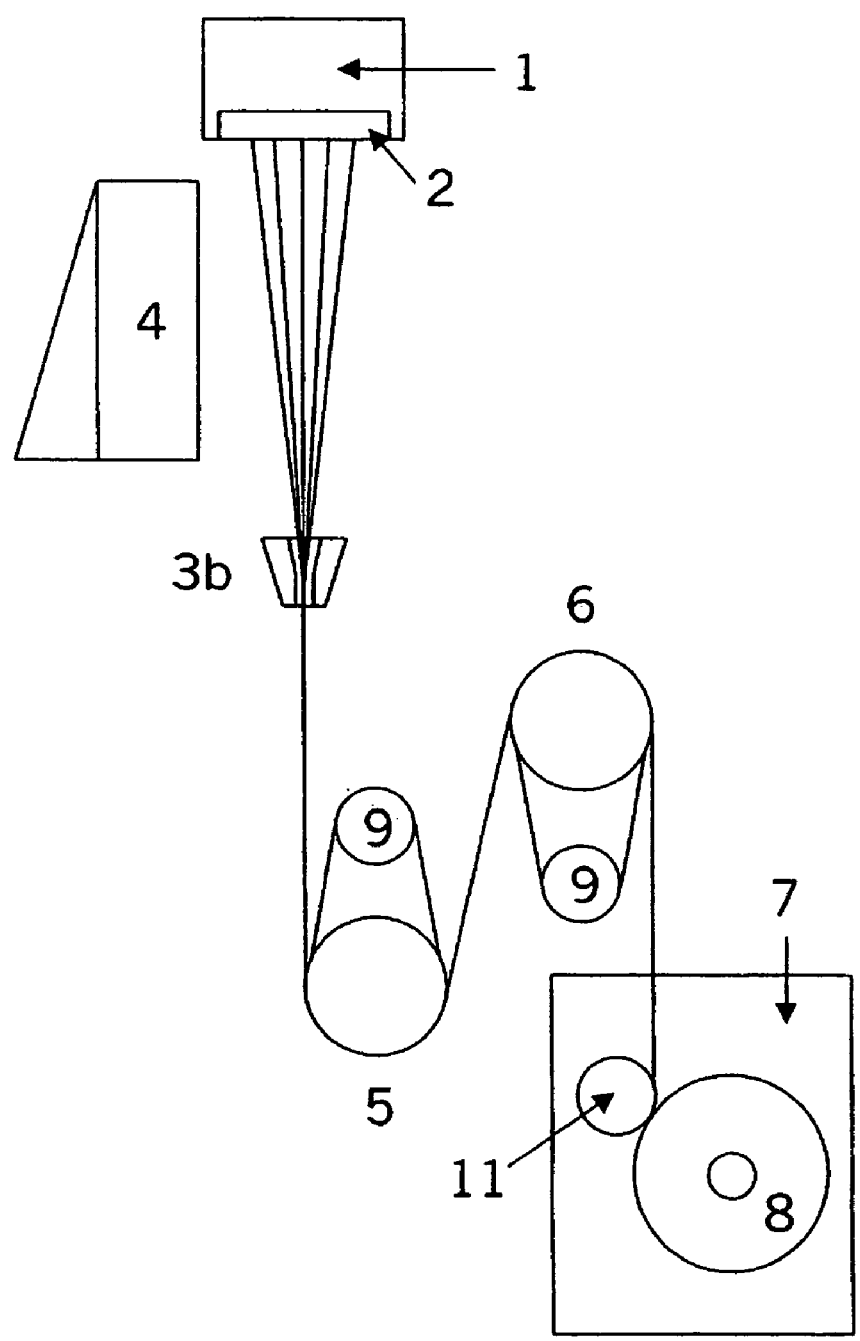
FIG. 2 is a schematic drawing showing an example of steps of a method of producing fibers comprising a thermoplastic cellulose derivative composition according to another embodiment of the present invention.

1: spinning pack
2: nozzle
3a: oil feed roller
3b: oil feed guide
4: chimney
5: first godet roller
6: second godet roller
7: winder
8: package
9: separate roller
10: dancer arm
11: drive roller

BEST MODE FOR CARRYING OUT THE INVENTION

In a first embodiment, the present invention provides a thermoplastic cellulose derivative composition comprised of a cellulose ester as a main component, which has an aliphatic polyester side chain having a repeat unit having 2 to 5 carbon atoms, wherein a heating loss at 200° C. is 5 wt % or less, a melt viscosity at 200° C. and 1000 sec$^{-1}$ is 50 to 300 Pa·sec, and a melt tension at the time of take-up at 200° C. and 100 m/min is 0.1 to 40 mN. Therefore, the thermoplastic cellulose derivative composition capable of melt spinning can be provided.

In the present invention, the aliphatic polyester having a repeat unit having 2 to 5 carbon atoms is preferably a compound represented by the following formula:

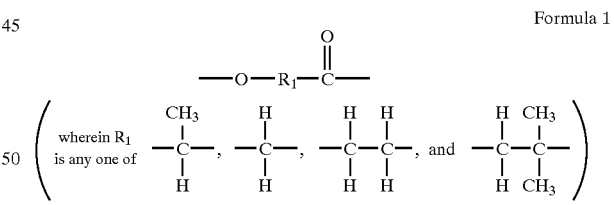

Formula 1

In the above compound, as in use of ε caprolactone, when straight chain R1 has a large number of carbon atoms, the glass transition temperature of the side chain decreases to deteriorate the high-temperature properties of the resultant fibers.

In the present invention, the aliphatic polyester side chain preferably has D-lactic acid and/or L-lactic acid as a repeat unit from the-viewpoint of heat resistance of the side chain and availability of a monomer.

More preferably, the aliphatic polyester side chain has D-lactic acid and L-lactic acid as essential repeat units, the molar ratio of D-lactic acid and L-lactic acid being 1:9 to 9:1. When the side chain polymer has any one of D-lactic acid and L-lactic acid at a composition ratio in the range of 98 mol % or more, the side chain exhibits significant crystallinity, and a melting point is observed in a DSC measurement. In this case, the obtained polymer has high brittleness, and may cause a problem in mechanical properties of a formed product. In order to make the side chain amorphous, the composition ratio of either D-lactic acid or L-lactic acid is preferably decreased. The molar ratio of D-lactic acid to L-lactic acid is more preferably 2:8 to 8:2. In this case, the polymer has good flexibility, and a formed product also has good mechanical properties. The polymer has the characteristic that it can be dissolved in acetone, which is a general-purpose solvent with low harmfulness, in spite of the side chain having lactic acid as the main repeat unit.

Furthermore, the cellulose derivative composition preferably contains 2 to 40% by weight of lactic acid homopolymer having a molecular weight of 1000 to 200,000 and having D-lactic acid and/or L-lactic acid as a main repeat unit.

In the present invention, cellulose ester represents a compound such as cellulose acetate in which hydroxyl groups of cellulose are partially or entirely sealed with ester bonds.

The substitution degree of the cellulose ester is preferably 0.5 to 2.9 per glucose unit. The substitution degree of the cellulose ester is preferably relatively low, for example, 0.5 to 2.2, for obtaining good biodegradability, and the substitution degree is preferably relatively high, for example, 2.2 to 2.9, for obtaining good fluidity. Therefore, the substitution degree of the cellulose ester can be appropriately determined according to purposes. The average degree of polymerization of the cellulose derivative is preferably 50 or more, more preferably 100 or more, and most preferably 150 or more, for obtaining composition fibers having excellent thermal stability and mechanical properties.

The aliphatic polyester side chain can be introduced into the cellulose ester by graft polymerization using a cyclic diester, a cyclic monoester, an oxycarboxylic acid, or the like as a monomer. A graft reaction may be effected in an organic solvent which can dissolve the cellulose ester and monomer used, or by using a batch-type kneader capable of heat-stirring under a shear force. Alternatively, the reaction may be effected by using a monoaxial or biaxial extruder. In any case, it is important to highly dry the raw materials supplied to the reaction to remove moisture therefore. In use of the batch-type kneader, the inside of the kneader is preferably replaced by a dry inert gas such as nitrogen or the like. In use of the extruder, the inside of the extruder is preferably replaced by a dry inert gas such as nitrogen or the like, or evacuated to a low-pressure state by using a pressure reducing device.

Examples of monomers used for a graft reaction include cyclic diesters such as lactide, glycolide, and the like; cyclic monoesters such as propiolactone, pivalolactone, and the like; oxycarboxylic acids such as lactic acid, glycolic acid, hydroxypropionic acid, and the like. For example, in order to obtain cellulose acetate having a graft side chain composed of D-lactic acid and/or L-lactic acid as a main component, a method of graft ring-opening polymerization of D-lactide and/or L-lactide used as a monomer, a method of graft ring-opening polymerization of D,L-lactide used as a monomer, and a method of graft ring-opening polymerization of D-lactide and/or L-lactide and D,L-lactide used as monomers can be used. However, other known methods may be used.

In a ring-opening graft reaction using a cyclic ester, a known ring-opening polymerization catalyst is preferably used. Example of such a catalyst which can be used include metals such as tin, zinc, titanium, bismuth, zirconium, germanium, antimony, sodium, potassium, aluminum, and the like, and derivatives thereof. Particularly, derivatives such as metal organic compounds, carbonates, oxides, halides, and the like are preferred. Examples of such derivatives include tin octanoate, tin chloride, zinc chloride, titanium chloride, alkoxy titanium, germanium chloride, zirconium oxide, antimony trioxide, alkyl aluminum, and the like.

The graft rate (rate of increase in weight of a cellulose ester relative to the weight before grafting) of the aliphatic polyester side chain is preferably 20 to 300%. A graft rate of over 20% is preferred because the great effect of imparting thermoplasticity facilitates melt spinning, thereby obtaining fibers having excellent physical properties and quality. A graft rate of 300% or less is also preferred because the small effect of the side chains facilitates expression of the preferred properties of a cellulose derivative, for example, hygroscopicity, water absorption, acetone solubility, etc. The graft rate of the aliphatic polyester side chain is more preferably 40 to 200%, and most preferably 50 to 150%.

The thermoplastic cellulose derivative composition according to the first embodiment of the present invention comprises the cellulose ester as the main component, which has the aliphatic polyester side chain. However, the thermoplastic cellulose derivative composition may further contain other additives in a range causing no deterioration in the gist of the present invention.

The thermoplastic cellulose derivative composition according to the first embodiment of the present invention exhibits a rate of heating loss of 5 wt % or less at 200° C. Herein, the rate of heating loss means a rate of decrease in weight at 200° C. when a sample is heated from room temperature to 300° C. at a heating rate of 10° C./min in a nitrogen atmosphere. When a large amount of low-molecular-weight plasticizer is not contained, and a rate of heating loss is 5 wt % or less, smoking does not occur in melt spinning to cause no defect in yarn making, thereby improving the mechanical properties of the resultant fibers. From the viewpoint of high heat resistance, a rate of heating loss at 200° C. is more preferably 3 wt % or less.

The thermoplastic cellulose derivative composition according to the first embodiment of the present invention has a melt viscosity at 200° C. and 1000 sec$^{-1}$ of 50 to 300 Pa·sec. When the melt viscosity at 200° C. and 1000 sec$^{-1}$ exceeds 50 Pa·sec, solidification sufficiently proceeds after spinning out, and thus fibers do not adhere to each other even in convergence. In this case, a sufficient nozzle back pressure can be obtained, and thus distributivity is improved to cause the advantage of securing size uniformity. On the other hand, when the melt viscosity is 300 Pa·sec or less, the spun filaments have good spinability, and sufficient orientation can be achieved to obtain fibers having excellent mechanical properties. Also, no trouble occurs due to an abnormal increase in pipe pressure. From the viewpoint of good fluidity, the melt viscosity at 200° C. and 1000 sec$^{-1}$ is preferably 70 to 250 Pa·sec, and more preferably 80 to 200 Pa·sec.

Furthermore, the thermoplastic cellulose composition according to the first embodiment of the present invention has a melt tension of 0.1 to 40 mN at the time of take-up at 200° C. and 100 m/min. Herein, the melt tension means a value measured by using a capillary rheometer, Capilograph produced by Toyo Seiki Co., Ltd., under the conditions including a temperature of 200° C., a take-up speed of 100 m/min, a die dimension of 1 mm in diameter by 10 mm in length, and a discharge rate of 9.55 cm$^3$/min. With a melt tension of 0.1 mN or more, an internal structure of a fiber is formed by the stress applied to the fiber during melt spinning, thereby improving the mechanical properties of the fiber. With a melt tension of 40 mN or less, the stress applied to a fiber does not exceed fiber strength, thereby permitting stable spinning without yarn breakage and single yarn flow and thus improving the quality of the obtained fiber. As the melt tension decreases, the spinability of the composition is improved. Therefore, the melt tension is more preferably 0.1 to 20 mN.

The thermoplastic cellulose derivative composition according to the first embodiment of the present invention may further contain a known plasticizer used for cellulose esters within a range in which the rate of heating loss at 200° C. is less than 5 wt %. When the composition contains a large amount of low-molecular-weight plasticizer, the rate of heating loss at 200° C. may exceed 5 wt %, and thus smoking possibly may occur due to evaporation of the plasticizer during melt spinning, or the problem of a feel of sliminess may occur due to bleedout of the plasticizer on the fiber surfaces. Therefore, the molecular weight of the plasticizer used is preferably 350 to 20,000, and more preferably 500 to 10,000. Particularly, when a relatively low-molecular weight plasticizer having a molecular weight of less than 1000 is used, the amount of the plasticizer used preferably does not exceed 20 parts by weight, and more preferably 10 parts by weight, relative to 100 parts by weight of the cellulose ester having the aliphatic polyester side chains. From the viewpoint of suppression of evaporation of the plasticizer, a different polymer may be blended as a plasticizer, or a plasticizer having a reactive functional group may be used.

Particularly, a polylactic acid homopolymer having a molecular weight of 1,000 to 200,000 and D-lactic acid and/or L-lactic acid as a main repeat unit has high compatibility with the cellulose ester having the aliphatic polyester side chains, and is thus an effective additive. The additive having a sufficiently high molecular weight has the effect of increasing the strength of the resultant thermoplastic cellulose derivative fibers. In order to increase strength, the weight average molecular weight of the polylactic acid homopolymer having D-lactic acid and/or L-lactic acid as the main repeat unit is preferably at least 1,000 or more, more preferably 10,000 or more, and most preferably 50,000 or more.

The polylactic acid homopolymer having D-lactic acid and/or L-lactic acid as the main repeat unit may be separately synthesized and then added to the cellulose ester, or synthesized at the same time as graft reaction of the aliphatic polyester with the cellulose ester. The amount of the polylactic acid homopolymer used is preferably 2 to 40% by weight relative to the total amount of the thermoplastic cellulose derivative composition. In order to improve compatibility between the cellulose derivative and the aliphatic polyester homopolymer, the amount of the aliphatic polyester homopolymer added is preferably 2 to 20% by weight, and more preferably 2 to 10% by weight.

In the first embodiment of the present invention, examples of relatively low-molecular weight plasticizer used as the plasticizer include phthalic acid esters such as dimethyl phthalate, diethyl phthalate, dihexyl phthalate, dioctyl phthalate, dimethoxyethyl phthalate, ethylphthalylethyl glycolate, butylphthalylbutyl glycolate, and the like; aromatic polyvalent carboxylic acid esters such as tetraoctyl pyromellitate, trioctyl trimellitate, and the like; aliphatic polyvalent carboxylic acid esters such as dibutyl adipate, dioctyl adipate, dibutyl sebacate, dioctyl sebacate, diethyl azelate, dibutyl azelate, dioctyl azelate, and the like; polyhydric alcohol lower fatty acid esters such as glycerin triacetate, diglycerin tetraacetate, and the like; phosphate esters such as triethyl phosphate, tributyl phosphate, tributoxyethyl phosphate, tricresyl phosphate, and the like.

Examples of relatively high-molecular weight plasticizers include aliphatic polyesters composed of glycol and dibasic acids, such as polyethylene adipate, polybutylene adipate, polyethylene succinate, polybutylene succinate, and the like; aliphatic polyesters composed of oxycarboxylic acids, such as polylactic acid, polyglycolic acid, and the like; aliphatic polyesters composed of lactones, such as polycaprolactone, polypropiolactone, polyvalerolactone, and the like; vinyl polymers such as polyvinylpyrrolidone, and the like.

Examples of a plasticizer having a reactive functional group include aromatic epoxy compounds such as monofunctional epoxy compounds such as phenyl glycidyl ether, polyglycidyl ether of polyhydric phenol having at least one aromatic ring or its alkylene oxide addition product, for example, glycidyl ethers produced by reaction of epichlorohydrin and bisphenol compounds such as bisphenol A, tetrabrome bisphenol A, bisphenol F, bisphenol S, and the like, or alkylene oxide (for example, ethylene oxide, propylene oxide, butylene oxide, or the like) addition products of bisphenol compounds; novolac epoxy resins (for example, phenol novolac epoxy resins, cresol novolac epoxy resins, brominated phenol novolac epoxy resins, and the like); trisphenol methane triglycidyl ether; and the like. Examples of alicyclic epoxy compounds include 4vinylcyclohexene monoepoxide, norbornene monoepoxide, limonene monoepoxide, 3,4-epoxycyclohexylmethyl-3,4epoxycyclohexane carboxylate, bis-(3,4epoxycyclohexylmethyl)adipate, 2-(3,4-epoxycyclohexyl-5,5spiro-3,4-epoxy) cyclohexanone-meta-dioxane, bis(2,3epoxycyclopentyl) ether, 2-(3,4-epoxycyclohexyl-5,5-spiro3,4-epoxy) cyclohexanone-metha-dioxane, 2,2-bis[4-(2,3epoxypropoxy)cyclohexyl]hexafluoropropane, and the like.

Examples of aliphatic epoxy compounds include epoxidized soybean fat and oil compounds such as epoxidized soybean oil, epoxidized linseed oil, and the like; epoxidized fatty acid esters such as epoxidized butyl stearate, and the like. Other examples include 1,4butanediol diglycidyl ether, 1,6-hexane diol diglycidyl ether, ethylene glycol diglycidyl ether, ethylene glycol monoglycidyl ether, propylene glycol diglycidyl ether, propylene glycol monoglycidyl ether, polyethylene glycol diglycidyl ether, propylene glycol diglycidyl ether, neopentyl glycol diglycidyl ether, neopentyl glycol monoglycidyl ether, glycerol diglycidyl ether, glycerol triglycidyl ether, trimethylolpropane diglycidyl ether, trimethylolpropane monoglycidyl ether, trimethylolpropane triglycidyl ether, diglycerol triglycidyl ether, sorbitol tetraglycidyl ether, allyl glycidyl ether, 2-ethylhexyl glycidyl ether, and the like. These plasticizers can be used singly or in a combination of these plasticizers.

The thermoplastic cellulose derivative composition according to the first embodiment of the present invention may further contain inorganic fine particles and organic compounds serving as a delustering agent, a deodorizing agent, a fire retardant, a yarn friction decreasing agent, an antioxidant, a coloring pigment, and the like according to demand.

The thermoplastic cellulose derivative composition of the present invention can be formed into fibers by melt spinning to obtain fibers having good mechanical properties.

The fibers comprising thermoplastic cellulose derivative composition according to the first embodiment of the present invention preferably have a strength of 0.5 to 4.0 cN/dtex.

With a strength of 0.5 cN/dtex or more, the passage properties in higher processing steps such as weaving and knitting are improved, and a final product also has sufficient strength. When a draft is improved for increasing strength, or molecular orientation is forcedly improved by a stretching operation, residual elongation may become excessively low. From the viewpoint of good strength, strength is more preferably 0.7 to 3.8 cN/dtex, and most preferably 1.0 to 3.5 cN/dtex.

The fibers comprising the thermoplastic cellulose derivative composition according to the first embodiment of the present invention preferably have an elongation of 2 to 50%. With an elongation of 2% or more, yarn breakage less occurs in higher processing steps such as weaving and knitting. With an elongation of 50% or less, the fibers are not deformed by a low stress, and thus no dyeing defect occurs in a final product due to sinkmarks produced in weaving. The elongation is more preferably 5 to 45%, and most preferably 10 to 40%.

The fibers comprising the thermoplastic cellulose derivative composition according to the first embodiment of the present invention preferably have a single yarn size of 0.5 to 100 dtex. With a single yarn size of 0.5 dtex or more, the fibers can be obtained with a high yarn making property by a direct melt spinning method. With a single yarn size of 100 dtex or less, flexural rigidity of a fiber structure does no become excessively high, and thus the fibers can be applied to clothing textiles which are required to have softness. The yarn size is more preferably 0.7 to 50 dtex, and most preferably 1.0 to 25 dtex.

The fibers comprising the thermoplastic cellulose derivative composition according to the first embodiment of the present invention preferably comprise multifilaments. In this case, the filament size is preferably constant in the axial direction of the fibers, and U % of the fibers is preferably 0.1 to 2.5%. With U % of less than 2.5%, deviation less occurs in the physical properties of the fibers, and also dyeing flecks less occur in a textile. From the viewpoint of uniformity of fibers, U % is more preferably 0.1 to 2.0%, and most preferably 0.1 to 1.5%.

The cross-sectional shape of the fibers comprising the thermoplastic cellulose derivative composition of the present invention is not limited, and the shape may be a substantially circular shape, or a modified cross-sectional shape such as a multi-leaf shape, a flat shape, an elliptic shape, a. W shape, a S shape, a X shape, a H shape, a C shape, a crossed shape, a double-crossed shape, a hollow shape, or the like. Furthermore, the fibers may be composite fibers such as core-sheath composite fibers, eccentric core-sheath composite fibers, side-by-side composite fibers, combined fibers with different sizes, or the like.

The fibers comprising the thermoplastic cellulose derivative composition of the present invention can be used for clothing filaments, clothing stables, industrial filaments, and industrial stable, and preferably used as nonwoven fabric fibers.

A method of producing the fibers comprising the thermoplastic cellulose derivative composition of the present invention will be described below.

In the method of producing the fibers comprising the thermoplastic cellulose derivative composition of the present invention, the thermoplastic cellulose derivative composition has a melt viscosity of 50 to 300 Pa·sec at 200° C. and 1000 sec$^{-1}$. When the melt viscosity at 200° C. and 1000 sec$^{-1}$ is 50 Pa·sec or more, a sufficient nozzle back pressure can be obtained, and distributivity is improved, thereby securing uniformity in multifilament size. With the composition having a low melt viscosity of less than 50 Pa·sec, solidification may not sufficiently proceed after spinning out, and thus the fibers may adhere to each other in convergence. With a melt viscosity of 300 Pa·sec or less, a polymer has good thermal fluidity, and thus a trouble due to an abnormal increase in pipe pressure can be avoided. From the viewpoint of high fluidity and distributivity, the melt viscosity at 200° C. and 1000 sec$^{-1}$ is more preferably 70 to 250 Pa·sec, and most preferably 80 to 200 Pa·sec.

Furthermore, in the method of producing the fibers comprising the thermoplastic cellulose derivative composition of the present invention, the melt tension at the time of take-up at 200° C. and 100 m/min is 0.1 to 40 mN. Herein, the melt tension represents a value measured by using a capillary rheometer, Capilograph produced by Toyo Seiki Co., Ltd., under the conditions including a temperature of 200° C., a take-up speed of 100 m/min, a die dimension of 1 mm in diameter by 10 mm in length, and a discharge rate of 9.55 cm$^3$/min. With a melt tension of 0.1 mN or more, an internal structure of a fiber is formed by the stress applied to the fiber during melt spinning. With a melt tension of 40 mN or less, the stress applied to a fiber does not exceed fiber strength, thereby permitting stable spinning without yarn breakage and single yarn flow. As the melt tension decreases, the spinability of the composition is improved. Therefore, the melt tension is more preferably 0.1 to 20 mN.

In the method of producing the fibers comprising the thermoplastic cellulose derivative composition of the present invention, the cellulose derivative is cellulose in which hydroxyl groups are sealed with substituents. Preferred examples of the cellulose derivative are cellulose esters. More specifically, the cellulose derivative may be a cellulose ester having an ester bond with a carboxylic acid, such as cellulose acetate, cellulose acetate propionate, cellulose acetate butylate, cellulose acetate phthalate, or the like, a cellulose ester having an ester bond with an oxycarboxylic acid such as lactic acid, glycolic acid, or hydroxybutyric acid, or its polymer, a cyclic ester such as caprolactone, propiolactone, valerolactone, pivalolactone, or the like, or its polymer, or a mixed ester of these esters.

The substitution degree of the cellulose derivative is preferably 0.5 to 2.9 per glucose unit. The substitution degree of the cellulose derivative is preferably relatively low, for example, 0.5 to 2.2, for obtaining good biodegradability, and the substitution degree is preferably relatively high, for example, 2.2 to 2.9, for obtaining good fluidity. Therefore the substitution degree of the derivative can be appropriately determined according to purposes.

The cellulose derivative may contain a known plasticizer used for cellulose derivatives. However, when the derivative contains a large amount plasticizer, smoking possibly occurs due to evaporation of the plasticizer during melt spinning, or the problem of a feel of sliminess occurs due to bleedout of the plasticizer on the fiber surfaces. Particularly, when a relatively low-molecular weight plasticizer having a molecular weight of less than 1000 is used, therefore, the amount of the plasticizer used preferably 20 wt % or less.

Examples of relatively low-molecular weight plasticizer used as the plasticizer include phthalic acid esters such as dimethyl phthalate, diethyl phthalate, dihexyl phthalate, dioctyl phthalate, dimethoxyethyl phthalate, ethylphthalylethyl glycolate, butylphthalylbutyl glycolate, and the like; aromatic polyvalent carboxylic acid esters such as tetraoctyl pyromellitate, trioctyl trimellitate, and the like; aliphatic polyvalent carboxylic acid esters such as dibutyl adipate, dioctyl adipate, dibutyl sebacate, dioctyl sebacate, diethyl azelate, dibutyl azelate, dioctyl azelate, and the like; polyhydric alcohol lower fatty acid esters such as glycerin triacetate, diglycerin tetraacetate, and the like; phosphate esters such as triethyl phosphate, tributyl phosphate, tributoxyethyl phosphate, tricresyl phosphate, and the like.

Examples of relatively high-molecular weight plasticizers include aliphatic polyesters composed of glycol and dibasic acids, such as polyethylene adipate, polybutylene adipate, polyethylene succinate, polybutylene succinate, and the like; aliphatic polyesters composed of oxycarboxylic acids, such as polylactic acid, polyglycolic acid, and the like; aliphatic polyesters composed of lactones, such as polycaprolactone, polypropiolactone, polyvalerolactone, and the like; vinyl polymers such as polyvinylpyrrolidone, and the like.

Examples of a plasticizer having a reactive functional group include aromatic epoxy compounds such as monofunctional epoxy compounds such as phenyl glycidyl ether, polyglycidyl ethers of polyhydric phenol having at least one aromatic ring or its alkylene oxide addition product, for example, glycidyl ethers produced by reaction of epichlorohydrin and phisphenol compounds such as bisphenol A, tetrabromo bisphenol A, bisphenol F, bisphenol S, and the like, or alkylene oxide (for example, ethylene oxide, propylene oxide, butylene oxide, or the like) addition products of bisphenol compounds; novolac epoxy resins (for example, phenol novolac epoxy resins, cresol novolac epoxy resins, brominated phenol novolac epoxy resins, and the like); trisphenol methane triglycidyl ether; and the like. Examples of alicyclic epoxy compounds include 4vinylcyclohexene monoepoxide, norbornene monoepoxide, limonene monoepoxide, 3,4-epoxycyclohexylmethyl-3,4epoxycyclohexane carboxylate, bis-(3,4epoxycyclohexylmethyl) adipate, 2-(3,4-epoxycyclohexyl-5,5spiro-3,4-epoxy) cyclohexanone-meta-dioxane, bis(2,3epoxycyclopentyl) ether, 2-(3,4-epoxycyclohexyl-5,5-spiro3,4-epoxy) cyclohexanone-metha-dioxane, 2,2-bis[4-(2,3-epoxypropoxy)cyclohexyl] hexafluoropropane, and the like.

Examples of aliphatic epoxy compounds include epoxidized soybean fat and oil compounds such as epoxidized soybean oil, epoxidized linseed oil, and the like; epoxidized fatty acid esters such as epoxidized butyl stearate, and the like. Other examples include 1,4-butanediol diglycidyl ether, 1,6-hexane diol diglycidyl ether, ethylene glycol diglycidyl ether, ethylene glycol monoglycidyl ether, propylene glycol diglycidyl ether, propylene glycol monoglycidyl ether, polyethylene glycol diglycidyl ether, propylene glycol diglycidyl ether, neopentyl glycol diglycidyl ether, neopentyl glycol monoglycidyl ether, glycerol diglycidyl ether, glycerol triglycidyl ether, trimethylolpropane diglycidyl ether, trimethylolpropane monoglycidyl ether, trimethylolpropane triglycidyl ether, diglycerol triglycidyl ether, sorbitol tetraglycidyl ether, allyl glycidyl ether, 2-ethylhexyl glycidyl ether, and the like. These plasticizers can be used singly or in a combination of these plasticizers.

In the method of producing the fibers comprising the thermoplastic cellulose derivative composition of the present invention, the thermoplastic cellulose derivative composition may further contain inorganic fine particles and organic compounds serving as a delustering agent, a deodorizing agent, a fire retardant, a yarn friction decreasing agent, an antioxidant, a coloring pigment, and the like according to demand.

In the method of producing the fibers comprising the thermoplastic cellulose derivative composition of the present invention, a preferred example of the thermoplastic cellulose derivative composition comprises a cellulose ester as a main component which has aliphatic polyester side chains having D-lactic acid and/or L-lactic acid as a main repeat unit, or comprises 85 to 98% by weight of a cellulose mixed ester and 1 to 30% by weight of plasticizer having a molecular weight of 350 to 20,000.

A description will now be made of melt spinning of the cellulose derivative composition in the method of producing the fibers comprising the-thermoplastic cellulose derivative composition of the present invention with reference to the drawings. The melting temperature can be appropriately selected from the range of 180 to 240° C. With a melting temperature of 180° C. or more, the melt viscosity of the composition is decreased to improve spinability. With a melting temperature of 240° C. or less, the cellulose ester main chain is less thermally decomposed, thereby increasing the strength of the final fibers. In order to secure high fluidity, and avoid thermal decomposition, the melting temperature is preferably 190 to 230° C., and more preferably 200 to 220° C. The melting temperature means the temperature of a spinning pack (1).

As a nozzle (2) for spinning, a known nozzle can be used, and the number of holes may be equal to a desired number of filaments or a natural multiple of the number of filaments. With an excessively large number of holes, uniform cooling may not be achieved in some cases, and thus the number of holes is preferably 1,000 or less. Although the diameter of the nozzle holes can be appropriately selected according to the melt viscosity of the polymer, and the spinning draft, the diameter is preferably 0.05 to 0.50 mm. With a diameter of 0.05 mm or more, an abnormal increase in the pressure in the spinning pack can be avoided, while with a diameter of 0.50 mm or less, the spinning draft can be decreased without decreasing the spinning rate. The diameter of the nozzle holes is more preferably 0.10 to 0.40 mm, and most preferably 0.20 to 0.30 mm.

In the method of producing the fibers comprising the thermoplastic cellulose derivative composition of the present invention, the filaments obtained by spinning need to be converged by using a device (3) for supplying an oiling agent or water at a distance of 0.5 to 5 m from the bottom of the nozzle. By supplying the oiling agent or water, the fibers, which have previously been subjected to air resistance for each yarn, can be then moved with little air resistance. Unlike polyester and polyamide, the cellulose ester polymer tends to have high melt tension and low spinability. Therefore, when the air resistance applied to a single yarn is increased, spinning tension is significantly increased to finally cause a single yarn flow and yarn breakage. Therefore, the step of converging the multifilaments is a very important step. As the method of supplying the oiling agent or water for converging filaments, a method of contact with an oiling roller (3a), or a method of contact with an oiling agent guide (3b) may be used.

Convergence needs to be carried out at a position after solidification of the filaments spun out in a melt state, and thus the convergence position is at a distance of 0.5 m or more from the bottom of the nozzle. In order to properly cool the filaments between the nozzle and the convergence position, a chimney (4) is preferably provided for blowing cooled or heated air. The convergence position needs to be at a distance of at most 5 m or less from the bottom of the nozzle. With a distance of over 5 m from the nozzle, spinning tension is significantly increased to frequently cause yarn breakage. The convergence position is preferably 0.8 to 3 m, and more preferably 1 to 2 m, from the bottom of the nozzle.

In the producing method of the present invention, the spinning rate can be determined by a godet roller (5) rotating at a constant speed. The rate of variation in the rotational speed of the godet roller is preferably ±0.5% or less, and more preferably ±0.1% or less. In an air suction system or flash spinning system in which the spinning rate varies, size uniformity cannot be obtained in the direction of the fiber length. The rotational speed of the godet roller is appropriately determined so that the spinning tension lies in the range of 0.1 to 3.0 mN/dtex. With a spinning tension of less than 0.1 mN/dtex, a fiber structure cannot be sufficiently formed. With a spinning tension of 3.0 mN/dtex or more, single yarn flow and yarn breakage frequently occurs, thereby deteriorating the yarn making properties. From the viewpoint of the good yarn making properties, the spinning tension is preferably 0.2 to 2.0 mN/dtex. The spinning rate for achieving this spinning tension varies with the polymer used and the spinning draft, and is thus not limited. Therefore, the spinning rate may be appropriately determined in the range of 200 to 2000 m/min.

Productivity is improved as the spinning draft increases. However, in the case of insufficient spinability, yarn breakage frequently may occur. With a spinning draft of 30 or more, the productivity is improved, but the spinning draft is more preferably 50 or more, and most preferably 100 or more. With a spinning draft of 300 or less, the spinning tension is not excessively increased, and thus the yarn making properties are good. The spinning draft is more preferably 250 or less, and most preferably 200 or less. Herein, the spinning draft is defined as a value obtained by dividing the linear speed (cm/sec) of the fibers discharged from the nozzle holes by the take-up speed (cm/sec).

The fibers taken up from the godet roller are stretched between the godet roller and a next roller (6), or taken up without being stretched. When the fibers are stretched, a Nelson system using a separate roller (9) rotating with an axis deviated from the axis of the godet roller can be used.

The filament separated from a final roller is wound on a package (8) by a winder (7). The winding tension is preferably 0.1 to 2.0 mN/dtex. With a winding tension of 0.1 mN/dtex or more, no trouble occurs in winding the filament on the final roller does not occur, and a winding shape becomes constant without deformation. While with a winding tension of 2.0 mN/dtex or less, yarn breakage does not occur in winding. The winding tension is more preferably 0.2 to 1.5 mN/dtex, furthermore preferably 0.4 to 1.0 mN/dtex. With an excessively high winding tension, tight winding on the package, and yarn breakage occur in some cases. The tension of winding on the package may be controlled by a tension controlling means (10) such as a dancer arm or the like, or by a system for controlling the speed of a drive roller (11) by detecting tension.

The method of producing the fibers comprising the thermoplastic cellulose derivative composition of the present invention can easily produce multifilaments, and decrease size deviation of the multifilaments in the direction of the fiber length. U % of the fibers wound on the package is preferably 0.1 to 2.5%, more preferably 0.1 to 2.0%, and most preferably 0.1 to 1.5%.

The method of producing the fibers comprising the thermoplastic cellulose derivative composition of the present invention can obtain fine fibers. The single yarn size of the fibers wound on the package is preferably 0.5 to 20 dtex, and more preferably 0.7 to 5.0 dtex.

The method of producing the fibers comprising the thermoplastic cellulose derivative composition of the present invention has no limit to the sectional shape of the resultant fibers, and can be applied to production of fibers having any known shape. For example, the production method can produce circular filaments by using a nozzle having circular holes, and modified cross-section yarns such as multi-leaf section yarns such as three-leaf section yarns, six-leaf section yarns, eight-leaf section yarns, and the like; W-shaped yarns, X-shaped yarns, C-shaped yarns, and cross-shaped yarns, and the like, by using nozzles having modified section holes. It is also possible to produce composite fibers such as core-sheath composite fibers, eccentric core-sheath composite fibers, side-by-side composite fibers, mixed fibers with different sizes, and the like. Therefore, the shape of the resultant fibers is not limited.

Fibers comprising a thermoplastic cellulose derivative composition according to another embodiment of the present invention will be described below.

The fibers comprising the thermoplastic cellulose derivative composition according to another embodiment of the present invention contain 85 to 98% by weight of a cellulose mixed ester, and 1 to 30% by weight of a plasticizer having a molecular weight of 350 to 20,000.

Herein, the mixed ester means an ester in which hydroxyl groups of cellulose are sealed with at least two types of ester bonds. Examples of the mixed ester include cellulose acetate propionate, cellulose acetate butyrate, cellulose acetate valerate, cellulose propionate butyrate, cellulose acetate laurate, cellulose acetate stearate, cellulose acetate oleate, and the like. From the viewpoint of raw material cost and east of production, cellulose acetate propionate, cellulose butyrate, and cellulose acetate phthalate are preferred.

Since cellulose acetate-propionate contains a propionyl group other than an acetyl group, and thus has lower biodegradability than cellulose acetate. However, cellulose acetate propionate has the advantage that the amount of the plasticizer added for forming fibers can be decreased because of its high thermal fluidity. When cellulose acetate is plasticized by using only an external plasticizer, it is necessary to add near 50% by weight of low-molecular weight plasticizer. In this case, the problems of evaporation of the plasticizer and defects in yarn making occur. With cellulose acetate propionate, the necessary amount of the plasticizer is 1 to 30% by weight, thereby causing less evaporation of the plasticizer and good yarn making properties.

When a longer functional group than a propionyl group is introduced, hydrophobicity is significantly increased, and biodegradability further deteriorates although the thermal fluidity is improved. Also, the production cost is increased, and reactivity of an ester reaction deteriorates, thereby causing difficulties in obtaining a cellulose fatty acid mixed ester having a desired substitution degree. Therefore, cellulose acetate propionate is most preferable as the cellulose mixed ester.

A known method of producing the cellulose mixed ester comprises estrifying cellulose with two fatty acid anhydrides to form a cellulose triester, and then hydrolyzing the cellulose triester to obtain a predetermined substitution degree. The cellulose mixed ester of the present invention may be obtained by this method or another known method.

The total substitution degree of the cellulose mixed ester is preferably 0.5 to 2.9 per glucose unit. The substitution degree of the cellulose mixed ester is preferably relatively low, for example, 0.5 to 2.2, for obtaining good biodegradability, and the substitution degree is preferably relatively high, for example, 2.2 to 2.9, for obtaining good fluidity. Therefore, the substitution degree can be appropriately determined according to purposes. The substitution degree of two ester groups or more is not limited, and the cellulose mixed ester with any desired substitution degree can be used. The mean degree of polymerization of the cellulose mixed ester is preferably 50 or more, more preferably 100 or more, and most preferably 150 or more. With a degree of polymerization of less than 50, mechanical properties may deteriorate to fail to obtain desired fiber properties in some cases.

The content of the plasticizer in the thermoplastic cellulose derivative composition of the present invention is preferably 1 to 30% by weight. With a content of 1% by weight or more, thermoplasticity is high, and spinability in melt spinning is good. With a content of 20% by weight or less, the plasticizer less evaporates in melt spinning to improve the yarn making properties. Also, the plasticizer does not bleed out to the fiber surfaces, and dimensional stability does not deteriorate. Furthermore, when a textile is formed, the textile has no feel of sliminess, and does not lack tensity and elasticity. The content of the plasticizer is more preferably 1 to 15% by weight, and most preferably 1 to 12% by weight.

The plasticizer has a molecular weight of 350 to 20,000. With a molecular weight of less than 350, even when the adding amount is small, the plasticizer evaporates in melt spinning, while with a molecular weight of over 20,000, the effect of the plasticizer cannot be easily obtained. The molecular weight of the plasticizer is more preferably 500 to 10,000, and most preferably 700 to 5,000.

The thermoplastic cellulose derivative composition of the present invention has a melt viscosity at 200° C. and 1000 sec$^{-1}$ of 50 to 300 Pa·sec. With a melt viscosity at 200° C. and 1000 sec$^{-1}$ of 50 Pa·sec or more, solidification sufficiently proceeds after spinning out, and thus fibers do not adhere to each other even in convergence. In this case, a sufficient nozzle back pressure can be obtained, and thus distributivity is improved to cause the advantage of securing size uniformity. On the other hand, when the melt viscosity is 300 Pa·sec or less, the spun filaments have good spinability, and sufficient orientation can be achieved to obtain fibers having excellent mechanical properties. Also, no trouble occurs due to an abnormal increase in pipe pressure. From the viewpoint of good fluidity, the metal viscosity at 200° C. and 1000 sec$^{-1}$ is preferably 70 to 250 Pa·sec, and more preferably 80 to 200 Pa·sec.

Example of the plasticizer used for the fibers comprising the thermoplastic cellulose derivative composition according to the another embodiment of the present invention include phthalic acid long-chain esters such as dihexyl phthalate, dioctyl phthalate, dimethoxyethyl phthalate, ethylphthalylethyl glycolate, butylphthalylbutyl glycolate, and the like; aromatic polyvalent carboxylic acid esters such as tetraoctyl pyromellitate, trioctyl trimellitate, and the like; aliphatic polyvalent carboxylic acid long-chain esters such as dioctyl adipate, dibutyl sebacate, dioctyl sebacate, dioctyl azelate, and the like; polyhydric alcohol long-chain esters such as glycerin trilaurate, glycerin tristearate, glycerin tripalmitate, and the like; polyhydric alcohol long-chain mixed esters such as glycerin diacetomonolaurate, glycerin diacetomonopalmitate, glycerin diacetomonostearate, glycerin diacetomonooleate, and the like; fatty acid esters of polyvalent alcohol polymers such as diglycerin tetraacetate, and the like; phosphate esters such as triethyl phosphate, tributyl phosphate, tributoxyethyl phosphate, tricresyl phosphate, and the like.

Examples of high-molecular weight plasticizers include aliphatic polyesters composed of glycol and dibasic acids, such as polyethylene adipate, polybutylene adipate, polyethylene succinate, polybutylene succinate, and the like; aliphatic polyesters composed of oxycarboxylic acids, such as polylactic acid, polyglycolic acid, and the like; aliphatic polyesters composed of lactones, such as polycaprolactone, polypropiolactone, polyvalerolactone, and the like; vinyl polymers such as polyvinylpyrrolidone, and the like; polyethers such as polyethylene glycol, and the like.

Preferred examples of the plasticizer include polylactic acid having a weight average molecular weight of 1,000 to 20,000, polyethylene glycol having a weight average molecular weight of 350 to 20,000, glycerin derivatives each having a molecular weight of 350 to 1,000, and the like. These plasticizers can be used singly or in a combination.

The fibers comprising the thermoplastic cellulose derivative composition according to another embodiment of the present invention preferably have a strength of 0.5 to 4.0 cN/dtex. With a strength of 0.5 cN/dtex or more, the passage properties in higher processing steps such as weaving and knitting are improved, and a final product also has sufficient strength. It is actually difficult to obtain fibers having a high strength of over 4.0 cN/dtex. When a draft is improved for increasing strength, or molecular orientation is forcedly improved by a stretching operation, residual elongation may become excessively low. From the viewpoint of good strength, strength is more preferably 0.7 to 3.8 cN/dtex, and most preferably 1.0 to 3.5 cN/dtex.

The fibers comprising the thermoplastic cellulose derivative composition of-the present invention preferably have an elongation of 2 to 50%. With an elongation of 2% or more, yarn breakage less occurs in higher processing steps such as weaving-and knitting. With an elongation of 50% or less, the fibers are not deformed by low stress, and thus no dyeing defect occurs in a final product due to sinkmarks produced in weaving. The elongation is more preferably 5 to 45%, and most preferably 10 to 40%.

The thermoplastic cellulose derivative fibers of the present invention preferably have a single yarn size of 0.5 to 100 dtex. With a single yarn size of 0.5 dtex or more, the fibers can be obtained with good yarn making properties by a direct melt spinning method to produce high-quality fibers. With a single yarn size of 100 dtex or less, flexural rigidity of a fiber structure does no become excessively high, and thus the fibers can be applied to clothing textiles which are required to have softness. The yarn size is more preferably 0.7 to 50 dtex, and most preferably 1.0 to 25 dtex.

The cross-sectional shape of the fibers comprising the thermoplastic cellulose derivative composition of the present invention is not limited, and the shape may be a substantially circular shape, or a modified cross-sectional shape such as a multi-leave shape, a flat shape, an elliptic shape, a W shape, a S shape, a X shape, a H shape, a C shape, a crossed shape, a double-crossed shape, a hollow shape, or the like. Furthermore, the fibers may be composite fibers such as a core-sheath composite, eccentric core-sheath composite, side-by-side composite, or combined fibers with different sizes, or the like.

The thermoplastic cellulose derivative fibers of the present invention can be used for clothing filaments, clothing stables, industrial filaments, and industrial stable, and preferably used as nonwoven fabric fibers.

The fibers comprising the thermoplastic cellulose derivative composition of the present invention preferably comprise multifilament. In this case, the filament size is preferably constant in the axial direction of the fibers, and the fibers preferably have a U % of 0.1 to 2.5%. With U % of less than 2.5%, deviation less occurs in the physical properties of the fibers, and also dyeing flecks less occur in a textile. From the viewpoint of uniformity of fibers, U % is more preferably 0.1 to 2.0%, and most preferably 0.1 to 1.5%.

The thermoplastic cellulose derivative fibers may further contain inorganic fine particles and organic compounds serving as a delustering agent, a deodorizing agent, a fire retardant, a yarn friction decreasing agent, an antioxidant, a coloring pigment, an electrostatic agent, an antibacterial agent, and the like according to demand.

The present invention will be described in further detail below with reference to examples. In these examples, each of characteristics was determined by the following method.

1. Rate of Heating Loss

A sample was heated from room temperature to 300° C. at a heating rate of 10° C./min in a nitrogen atmosphere by using TG-DTA2000S produced by MacScience Co., and a change in weight of 10 mg of sample at 200° C. was measured as a rate of heating loss.

2. Melt Viscosity

The melt viscosity of 20 g of a sample, which had been put into an absolute dry condition by vacuum drying at 60° C. for 24 hours, was measured by using a capillary rheometer, Capilograph produced by Toyo Seiki Co., Ltd., under the conditions including a temperature of 200° C. and a die dimension of 1 mm in diameter by 10 mm in length, and a relational expression indicating a relation of the dependency of melt viscosity on shear rate was obtained. The melt viscosity at a shear rate of 1000 sec$^{-1}$ was calculated as the melt viscosity (Pa·sec) of a composition from the relational expression.

3. Melt Tension 20 g of a test sample which had been put into an absolute dry condition by vacuum drying at 60° C. for 24 hours, was measured with respect to a tension applied to a roller by using Capilograph produced by Toyo Seiki Co., Ltd. under the conditions including a temperature of 200° C., a roller speed of 100 m/min, a discharge rate of 9.55 cm$^3$/min, and a die dimension of 1 mm in diameter by 10 mm in length. The measured tension was considered as melt tension (mN).

4. Strength and Elongation

A tensile test was carried out by using Tensilone UCT-100 model produced by Orientech Co., Ltd. under the conditions including a sample length of 20 cm, and a tensile rate of 20 mm/min to measure stress as a strength (cN/dtex) of fibers with the maximum load applied. An elongation at the time of breakage was considered as an elongation (%) of fibers.

5. U %

Measurement was performed by using Uster Tester 4-CX produced by Zellweger Uster Co., Ltd. at a yarn feed rate of 25 m/min for 1 minute. The measured value was considered as U %.

6. Yarn Making Property

Melt spinning was carried out at a spinning rate of 1000 m/min to evaluate the yarn making property. A sample producing no yarn breakage per kg was evaluated as ⊙, a sample producing 1 to 3 times of yarn breakage was evaluated as ○, a sample producing 4 times or more of yarn breakage was evaluated as △, and a sample incapable of making a yarn was evaluated as x.

7. Texture

A 27-gauge circular knit was formed by using the resultant fibers, and its texture was evaluated by a sensory test. A knit having a feel of dryness was evaluated as ○, a knit having less feel of dryness and some feel of sliminess was evaluated as △, and a knit having a considerable feel of sliminess was evaluated as x.

8. Melting Point 10 mg of sample was precisely weighed, and heated at 15° C./min by DSC (DSC-7 produced by Perkin Elmer Co., Ltd.) to obtain a thermogram. In the thermogram, the peak temperature at an endothermic peak was determined as a melting point. However, the peak temperature of a peak having a width of 50° C. or more, or a weak peak with an endothermic amount of less than 5 J/g was not recognized as a melting point.

9. Acetone Solubility

An excess of acetone (produced by Wako Pure Chemical Industries, Ltd.) was added to a sample, and stirred at room temperature (20° C.) for 48 hours to measure solubility by examining whether or not an unnecessary solid was observed.

EXAMPLES 1 AND 2

100 parts by weight of cellulose diacetate (acetylation degree of 55%, average degree of polymerization of 160), which had been put into an absolute dry condition by vacuum drying at 60° C. for 24 hours, and 400 parts by weight of L-lactide (produced by Purac Co., Ltd.), which had been put into an absolute dry condition by vacuum drying at 60° C. for 24 hours, were charged in a four-neck flask with a Dimroth condenser and a thermocouple, in which an $N_2$ atmosphere was formed. The flask was heated to 140° C. by immersing in an oil bath, and stirred for 60 minutes to dissolve the system contained in the flask. Then, 0.2 parts by weight of tin octanoate was added as a ring-opening polymerization catalyst, and the resultant mixture was reacted for 30 minutes. After the completion of reaction, the flask was taken out of the oil bath and cooled, and chloroform was added to the flask to completely dissolve the system. A chloroform solutions of the reaction product was re-crystallized in an excess of methanol to obtain a flake-shaped precipitate. The precipitate was aggregated and dried, and the weight of the precipitate was measured. The resultant polymer was referred to as "P1".

The rate of an increase in weight (graft rate) to the weight the loaded cellulose diacetate was 98%. As a result of measurement of a rate of heating loss of polymer P1 at 200° C., the rate of heating loss was 1.3%, and thus heat resistance was sufficiently excellent. The melt viscosity was 120 Pa·sec, and thus polymer P1 exhibited good fluidity. The melt tension was 12 mN.

After polymer P1 was put into an absolute dry condition; by drying at 60° C. for 24 hours, the polymer was melted by using a monoaxial melt spinning machine at a melter temperature of 220° C. and a pack portion temperature of 220° C., and spun out from a nozzle having 24 holes of 0.23 mm in diameter and 0.30 mm in length at a discharge rate of 6.6 g/min. As a result, smoking of the spun filaments was not observed, and a discharge condition was also stable. The spun filaments were cooled by a chimney wind of 25° C., and converged with an oiling agent applied thereto. Then, the filaments were taken up by a first godet roller rotating at 500 m/min and 1000 m/min in examples 1 and 2, respectively, and then wound by a winder rotating at a speed so that the winding tension was 0.1 cN/dtex, through a second godet roller rotating at the same speed as the first godet roller. The yarn making properties in melt spinning were good without yarn breakage.

The thus-obtained fibers had a single yarn size of 3 to 6 dtex. The fibers also had a strength of 0.8 to 1.1 cN/dtex, and an elongation of 12 to 15%. Therefore, the fibers had strength and elongation necessary to pass through higher processing steps. The obtained fibers were knitted by a cylindrical knitting machine (cylindrical knitting machine MR1 model produced by Maruzen Sangyo Co., Ltd., 27 gauge) to form a knitted fabric. The thus-obtained knitted fabric had good knitting properties, and a soft and dry texture.

Table 1 shows U % of the obtained fibers. The fibers had excellent size uniformity.

EXAMPLE 3

The same procedure as Example 1 was repeated except that the ratio of tin octanoate loaded was 0.5% by weight relative to 100 parts by weight of cellulose diacetate to form a polymer. This polymer was referred to as "P2".

The rate of an increase in weight (graft rate) of polymer P2 relative to the weight of the loaded cellulose diacetate was 310%. As a result of measurement of a rate of heating loss of polymer P2, the rate of heating loss was 3.2%, and thus polymer P2 had sufficiently excellent heat resistance. The melt viscosity was 75 Pa·sec, and thus polymer P1 exhibited good fluidity. The melt tension was 5 mN.

Then, melt spinning was performed at a spinning rate of 500 m/min by the same method as Example 1 except that polymer P2 was used, a nozzle having 4 holes was used, and a discharge rate was 4.4 g/min. As a result, smoking of the spun yarn was not observed, and a discharge condition was also stable. Also, the yarn making properties in melt spinning were good without yarn breakage.

The thus-obtained fibers had a single yarn size of 22 dtex. Since the graft rate was high, the fibers had a strength of 0.6 cN/dtex, and an elongation of 43%. The obtained fibers were knitted by a cylindrical knitting machine to form a knitted fabric. As a result, some kinks occurred, but the fibers could be knitted, and the thus-obtained knitted fabric had a soft and dry texture.

Table 1 shows U % of the obtained fibers. The fibers had excellent size uniformity.

EXAMPLE 4

The same procedure as Example 1 was repeated except that the ratio of tin octanoate loaded was 0.15% by weight relative to 100 parts by weight of cellulose diacetate to form a polymer. The graft rate of the thus-obtained polymer was 58%. The resultant precipitate was aggregated and dried, and then 20 parts by weight of poly L-lactic acid having a weight average molecular weight of 125,000 and separately prepared and dried, was added to 100 parts by weight of grafted cellulose acetate. The resultant mixture was kneaded by a biaxial extruder, and then pelletized. The thus-obtained polymer was referred to as "P3".

The rate of heating loss of polymer P3 was 2.2%, and thus polymer P3 had sufficiently excellent heat resistance. The melt viscosity was 150 Pa·sec, and the melt tension was 20 mN.

Then, melt spinning was performed by the same method as Example 1 except that the spinning rate was 1500 m/min, and the discharge rate was 7.9 g/min. As a result, smoking of the spun filaments was not observed, and a discharge condition was also stable. Since the spinning rate was high, single yarn flow was observed to some extent, but the yarn making properties are good as a whole.

The thus-obtained fibers had a single yarn size of 2.2 dtex. The fibers had a strength of as high as 1.9 cN/dtex, but the elongation was 8%. The obtained fibers were knitted by a cylindrical knitting machine to form a knitted fabric. As a result, a kink occurred, but the fibers could be knitted, and the thus-obtained knitted fabric had a soft and dry texture.

Table 1 shows U % of the obtained fibers. The fibers had excellent size uniformity.

TABLE 1

|  | Example 1 | Example 2 | Example 3 | Example 4 |
| --- | --- | --- | --- | --- |
| Main chain compound | Cellulose diacetate | Cellulose diacetate | Cellulose diacetate | Cellulose diacetate |
| Side chain monomer unit | D-lactic acid:L-lactic acid = 0:100 | D-lactic acid:L-lactic acid = 0:100 | D-lactic acid:L-lactic acid = 0:100 | D-lactic acid:L-lactic acid = 0:100 |
| Side chain graft rate (%) | 98 | 98 | 310 | 58 |
| Additive | — | — | — | Polylactic acid (20 parts by weight) |
| Rate of heating loss (%) | 1.3 | 1.3 | 3.2 | 2.2 |
| Melt viscosity (Pa · sec) | 120 | 120 | 75 | 150 |
| Melt tension (mN) | 12 | 12 | 5 | 20 |
| Strength (cN/dtex) | 0.8 | 1.1 | 0.6 | 1.9 |
| Elongation (%) | 15 | 12 | 43 | 8 |
| Single yarn size (dtex) | 6 | 3 | 22 | 2.2 |
| U % (%) | 0.8 | 1.2 | 0.7 | 1.5 |
| Yarn making property | ⊙ | ⊙ | ⊙ | ○ |
| Texture | ○ | ○ | ○ | ○ |

EXAMPLE 5

100 parts by weight of cellulose acetate (substitution degree of 2.5, average degree of polymerization of 160) and 400 parts by weight of D,L-lactide (produced by Purac Co., Ltd.) were dried, and were charged in a four-neck flask with a Dimroth condenser, in which an $N_2$ atmosphere was formed. The flask was heated to 140° C. by immersing in an oil bath, and stirred for 60 minutes to dissolve a system contained in the flask. Then, 0.2 parts by weight of tin octanoate was added as a ring-opening polymerization catalyst, and the resultant mixture was reacted for 30 minutes. After the completion of reaction, the flask was taken out of the oil bath and cooled, and acetone was added to the flask to completely dissolve the system. In this example, it was found that no insoluble solid was observed, and the reaction product was dissolved in acetone. An acetone solution of the reaction product was re-crystallized in an excess of methanol to obtain a rice-cake-like soft precipitate. The precipitate was aggregated and dried, and the weight of the precipitate was measured. The resultant polymer was referred to as "P4".

The molar ratio of D-lactic acid to L-lactic acid used for forming side chains of polymer P4 was 50:50, and a melting point was not observed in a DSC curve. The rate of an increase in weight (graft rate) to the weight of the loaded cellulose acetate was 400%. As a result of measurement of a rate of heating loss of polymer P4 at 200° C., the rate of heating loss was 1.5%, and thus heat resistance was sufficiently excellent. The melt viscosity was 83 Pa·sec, and thus polymer P4 exhibited good fluidity. The melt tension was as low as 5 mN.

After polymer P4 was put into an absolute dry condition by drying at 60° C. for 24 hours, the polymer was melted by using a monoaxial melt spinning machine at a melter temperature of 220° C. and a pack portion temperature of 220° C., and spun out from a nozzle having 24 holes of 0.23 mm in diameter and 0.30 mm in length at a discharge rate of 7.2 g/min. As a result, smoking of the spun filaments was not observed, and a discharge condition was also stable. The spun filaments were cooled by a chimney wind of 25° C., and converged with an oiling agent applied thereto. Then, the filaments were taken up by a first godet roller rotating at 1000 m/min, and then wound by a winder rotating at a speed so that the winding tension was 0.1 cN/dtex, through a second godet roller rotating at the same speed as the first godet roller. The yarn making properties in melt spinning were good.

The thus-obtained fibers had a single yarn size of 3 dtex. The fibers also had a strength of 1.5 cN/dtex, and an elongation of 22.1%. Therefore, the fibers had strength and elongation necessary to pass through higher processing steps. The obtained fibers were knitted by a cylindrical knitting machine (cylindrical knitting machine MRI model produced by Maruzen Sangyo Co., Ltd., 27 gauge) to form a knitted fabric. The thus-obtained knitted fabric had good knitting properties, and a texture with some feel of sliminess because of the influence of side chains.

EXAMPLE 6

The same procedure as Example 1 was repeated except that the amount of the D,L-lactide loaded was 120 parts by weight and the amount of the L-lactide loaded was 180 parts by weight, relative to 100 parts by weight of cellulose acetate, to form a polymer. The resultant polymer was referred to as "P5". Polymer P5 was soluble in acetone.

The molar ratio of D-lactic acid to L-lactic acid used for forming side chains of polymer P5 was 20:80, and a melting point was not observed in a DSC curve. The rate of an increase in weight (graft rate) relative to the weight of the loaded cellulose diacetate was 300%. As a result of measurement of a rate of heating loss of polymer P5, the rate of heating loss was 1.5%, and thus heat resistance was sufficiently good. The melt viscosity was 120 Pa·sec, and thus polymer P5 exhibited good fluidity. The melt tension was as low as 10 mN.

Melt spinning was performed at a spinning rate of 1000 m/min by the same method as Example 5 except that polymer P5 was used, and the discharge rate was 4.8 g/min. As a result, smoking of the spun filaments was not observed, and a discharge condition was also stable. Also, the yarn making properties in melt spinning were good.

The thus-obtained fibers had a single yarn size of 2.0 dtex. The fibers also had good mechanical properties such as a strength of 1.2 cN/dtex, and an elongation of 23.2%. The obtained fibers were knitted by a cylindrical knitting machine to form a knitted fabric. The thus-obtained knitted fabric had a soft and dry texture.

EXAMPLE 7

The same procedure as Example 1 was repeated except that the amount of the D-lactide loaded was 30 parts by weight, and the amount of the L-lactide loaded was 70 parts by weight, relative to 100 parts by weight of cellulose acetate, to form a polymer. The resultant polymer was referred to as "P6". Polymer P6 was soluble in acetone.

The molar ratio of D-lactic acid to L-lactic acid used for forming side chains of polymer P5 was 30:70, and a melting point was not observed in a DSC curve. The rate of an increase in weight (graft rate) relative to the weight of the loaded cellulose diacetate was 100%. As a result of measurement of a rate of heating loss of polymer P6, the rate of heating loss was 3.3%, and thus heat resistance was sufficiently good. The melt viscosity was 255 Pa·sec, and thus polymer P6 exhibited good fluidity. The melt tension was as low as 7 mN.

The melt spinning was performed at a spinning rate of 1000 m/min by the same method as Example 5 except that polymer P6 was used, and the discharge rate was 19.2 g/min. As a result, smoking of the spun yarns was not observed, and a discharge condition was also stable. Although some single yarn flow occurred in melt spinning, the yarn flow was in a range permitting yarn making.

The thus-obtained fibers had a single yarn size of 8.0 dtex. The fibers also had a strength of 0.8 cN/dtex, and an elongation of 12.3%. The obtained fibers were knitted by a cylindrical knitting machine to form a knitted fabric. The thus-obtained knitted fabric had a soft and dry texture.

EXAMPLE 8

The same procedure as Example 1 was repeated except that cellulose acetate having a substitution degree of 1.9 and a polymerization degree of 130 was used, and the amounts of the D-lactide and L-lactide loaded were 120 parts by weight and 280 parts by weight, respectively, relative to 100 parts by weight of cellulose acetate, to form a polymer. The resultant polymer was referred to as "P7". Polymer P7 was soluble in acetone.

The molar ratio of D-lactic acid to L-lactic acid used for forming side chains of polymer P7 was 30:70, and a melting point was not observed in a DSC curve. The rate of an increase in weight (graft rate) relative to the weight of the loaded cellulose diacetate was 400%. As a result of measurement of a rate of heating loss of polymer P7, the rate of heating loss was 1.9%, and thus heat resistance was sufficiently good. The melt viscosity was 98 Pa·sec, and thus polymer P6 exhibited good fluidity. The melt tension was as low as 9 mN.

The melt spinning was performed at a spinning rate of 1000 m/min by the same method as Example 5 except that polymer P7 was used. As a result, smoking of the spun yarns was not observed, and a discharge condition was also stable. Although some single yarn flow occurred in melt spinning, the yarn flow was in a range permitting yarn making.

The thus-obtained fibers had a single yarn size of 3.0 dtex. The fibers also had a strength of 0.8 cN/dtex, and an elongation of 15.3%. The obtained fibers were knitted by a cylindrical knitting machine to form a knitted fabric. The thus-obtained knitted fabric had a texture having some feed of sliminess due to the influence of the side chains.

TABLE 2

|  | Example 5 | Example 6 | Example 7 | Example 8 |
|---|---|---|---|---|
| Substitution degree of cellulose acetate | 2.5 | 2.5 | 2.5 | 1.9 |
| D-lactic acid:L-lactic acid | 50:50 | 20:80 | 30:70 | 30:70 |
| Side chain graft rate (%) | 400 | 300 | 100 | 400 |
| Additive | — | — | — | — |
| Rate of heating loss (%) | 1.5 | 1.5 | 3.3 | 1.9 |
| Melt viscosity (Pa · sec) | 83 | 120 | 255 | 98 |
| Melt tension (mN) | 5 | 10 | 7 | 9 |
| Strength (cN/dtex) | 1.5 | 1.2 | 0.8 | 0.8 |
| Elongation (%) | 22.1 | 23.2 | 12.3 | 15.3 |
| Single yarn size (dtex) | 3.0 | 2.0 | 8.0 | 3.0 |
| U % (%) | 0.7 | 0.5 | 1.2 | 1.9 |
| Yarn making property | ⊙ | ⊙ | ⊙ | ○ |
| Texture | Δ | ○ | ○ | Δ |

COMPARATIVE EXAMPLE 1

Polyethylene glycol having a molecular weight of 400 and cellulose diacetate having a substitution degree of 2.5 were dissolved in acetone so that the weight ratio was 1:9, and the resultant solution was formed into a sheet by a cast method. The thus-obtained polymer was referred to as "P8".

Polymer P8 had a melt viscosity at 200° C. of 320 Pa·sec, and a melt tension of 120 mN.

As a result of the same melt spinning as Example 5 by using polymer P8, spinability was low due to excessively high melt viscosity and melt tension, thereby failing to stably form yarns and to obtain fibers.

COMPARATIVE EXAMPLE 2

The same procedure as Example 5 was repeated except that the amounts of the cellulose diacetate, lactide and tin octanoate loaded in reaction were 100 parts by weight, 50 parts by weight, and 0.5 parts by weight, respectively, to form a polymer. The thus-obtained polymer was referred to as "P9".

The rate (graft rate) of increase in weight of polymer P9 to the weight of the cellulose diacetate loaded was 28%, and the rate of heating loss of polymer P9 was 1.9%. Polymer P9 had a melt viscosity of as high as 580 Pa·sec, but a melt tension could not be measured because a gut could not be obtained.

As a result of the same melt spinning as Example 5 by using polymer P9, spinability was low due to an excessively high melt viscosity, thereby failing to stably form yarns and to obtain fibers.

COMPARATIVE EXAMPLE 3

The same procedure as Example 5 was repeated except that ε caprolactone produced by Wako Pure Chemical Industries, Ltd. was used as a reaction monomer in place of lactide, the amounts of the cellulose diacetate and ε caprolactone loaded in reaction were 100 parts by weight and 80 parts by weight, respectively, and acetone was used as a solvent for dissolving the resultant polymer, to form a polymer. The thus-obtained polymer was referred to as "P10".

The rate (graft rate) of increase in weight of polymer P10 to the weight of the cellulose diacetate loaded was 50%, and the rate of heating loss of polymer P10 was 3.8%. Polymer P10 had a melt viscosity of 55 Pa·sec, and a melt tension of 3 mN. As a result of melt spinning at a spinning rate of 1000 m/min, four times of yarn breakage per kg occurred, thereby causing poor yarn making properties.

The melt spinning was performed by the same method as Example 5 except that polymer P10 was used. The thus-obtained fibers had a strength of as low as 0.2 cN/dtex, and an elongation of as high as 80%. Therefore, when the fibers were knitted by a cylindrical knitting machine to form a knitted fabric, softening occurred due to frictional heating, and the knitting properties were also insufficient. The thus-obtained knitted fabric also had a great feel of sliminess, and was thus unsuitable as clothing materials.

COMPARATIVE EXAMPLE 4

The same procedure as Example 5 was repeated except that the amounts of the cellulose diacetate, lactide and tin octanoate loaded in reaction were 100 parts by weight, 1000 parts by weight, and 0.5 parts by weight, respectively, to form a polymer. The thus-obtained polymer was referred to as "P11".

The rate (graft rate) of increase in weight of polymer P11 to the weight of the cellulose diacetate loaded was 920%, and the rate of heating loss of polymer P11 was 5.2%. Polymer P11 had a melt viscosity of as low as 31 Pa·sec because of an increase in side chains, and a melt tension of 7 mN. As a result of evaluation of the yarn making properties by using polymer P11 at a spinning rate of 1000 m/min, six times of yarn breakage per kg occurred, thereby causing poor yarn making properties.

As a result of melt spinning at a spinning rate of 500 m/min by the same method as Example 1 except that polymer P11 was used, smoking of the spun yarn due to thermal decomposition of side chains was observed. Also, distributivity of single yarns was low due to an excessively low pack pressure, thereby frequently causing yarn breakage due to mixing of fine and thick fibers.

The obtain fibers had a single yarn size of 6.0 dtex, a strength of 0.3 cN/dtex, and an elongation of 1.8%. Furthermore, the fibers had high brittleness due to an excessively large number of graft side chains. When a knitted fabric was formed by a cylindrical knitting machine, yarn breakage frequently occurs to make knitting impossible.

The obtained fibers had U % of as high as 7% due to a large variation in single yarn size.

TABLE 3

|  | Comparative Example 1 | Comparative Example 2 | Comparative Example 3 | Comparative Example 4 |
|---|---|---|---|---|
| Main chain compound | Cellulose diacetate | Cellulose diacetate | Cellulose diacetate | Cellulose diacetate |
| Side chain monomer unit | — | Lactic acid | $\epsilon$ caprolactone | L-lactic acid |
| Side chain graft rate (%) | 0 | 28 | 50 | 920 |
| Additive | PEG400 (10 parts by weight) | — | — |  |
| Rate of heating loss (%) | 8 | 1.9 | 3.8 | 5.2 |
| Melt viscosity (Pa · sec) | 320 | 580 | 55 | 31 |
| Melt tension (mN) | 120 | — | 3 | 7 |
| Strength (cN/dtex) | — | — | 0.2 | 0.3 |
| Elongation (%) | — | — | 80 | 1.8 |
| Single yarn size (dtex) | — | — | 5 | 2.2 |
| U % (%) | — | — | 2.5 | 7 |
| Yarn making property | X | X | Δ | Δ |
| Texture | — | — | X | — |

EXAMPLE 9

Cellulose acetate propionate (Tenite Propionate produced by Eastman Co., Ltd.) having a melt viscosity at 200° C. of 120 Pa·sec and a melt tension of 12 mN, and containing dioctyl adipate as a plasticizer was used as a thermoplastic cellulose ester composition, melted at a melting temperature of 210° C. and a spinning temperature of 210° C. by an extruder type spinning machine, and spun out of a nozzle having 36 holes of 0.20 mm in diameter—0.30 mm in length so that the discharge rate was 8 g/min.

The spun filaments were cooled by a chimney wind of 25° C., and converged with an oiling agent applied thereto from an oil supply guide disposed at a distance of 2 m from the bottom of the nozzle. Then, the filaments were taken up by a first godet roller rotating at 1000 m/min. In this example, the draft was 155.

The filaments were further wound by a winder driven by a drive roller so that the winding tension was 0.15 mN/dtex, through a second godet roller rotating at 1000 m/min.

The spinning tension was a sufficiently low value of 0.2 mN/dtex, and yarn breakage was not observed in spinning, thereby exhibiting good yarn making properties.

The resultant fibers showed U % of 0.8%, and excellent size uniformity.

EXAMPLE 10

Spinning was performed by the same method as Example 9 except that the spinning temperature was 200° C., the discharge rate was 7.2 g/min, the nozzle hole diameter was 0.3 mm, and the spinning rate was 600 m/min. In this example, the draft was 233.

The spinning tension was a sufficiently low value of 0.5 mN/dtex, and yarn breakage was not observed in spinning, thereby exhibiting good yarn making properties. The resultant fibers showed U % of 1.2%, and excellent size uniformity.

EXAMPLE 11

30 wt % of L-lactic acid oligomer having a weight average molecular weight of 800, and 70 wt % of cellulose diacetate having a substitution degree of 2.5 were pre-kneaded by a biaxial extruder, and then chipped. The thus-obtained polymer composition had a melt viscosity at 200° C. of 150 Pa·sec, and a melt tension of 25 mN.

The composition was melted at a melting temperature of 220° C. and a spinning temperature of 220° C. by an extruder type spinning machine, and spun out of a nozzle having 24 holes of 0.18 mm in diameter—0.30 mm in length so that the discharge rate was 26.7 g/min.

The spun filaments were cooled by a chimney wind of 25° C., and converged with an oiling agent applied thereto from an oil supply guide disposed at a distance of 1 m from the bottom of the nozzle. Then, the filaments were taken up by a first godet roller rotating at 2000 m/min. In this example, the draft was 50.3.

The filaments were further wound by a winder driven by a drive roller so that the winding tension was 0.15 mN/dtex, through a second godet roller rotating at 2000 m/min.

The spinning tension was a sufficiently low value of 1.2 mN/dtex, and some smoking was observed in spinning. However, the yarn making properties were good without yarn breakage. The resultant fibers showed U % of 1.1%, and excellent size uniformity.

TABLE 4

|  | Example 9 | Example 10 | Example 11 |
|---|---|---|---|
| Polymer | CAP + dioctyl adipate | CAP + dioctyl adipate | CDA + polylactic acid |
| Melt viscosity (Pa · sec) | 120 | 120 | 150 |
| Melt tension (mN) | 12 | 12 | 25 |
| Spinning temperature (° C.) | 210 | 200 | 220 |
| Nozzle hole diameter (mm) | 0.20 | 0.30 | 0.18 |
| Number of nozzle holes | 36 | 36 | 24 |
| Draft | 155 | 233 | 50.3 |
| Spinning rate (m/min) | 1000 | 600 | 2000 |
| Convergence position (m) | 2 | 2 | 1 |
| Spinning tension (mN/dtex) | 0.2 | 0.5 | 1.2 |
| Winding tension (mN/dtex) | 0.15 | 0.15 | 0.15 |
| Yarn making property | ⊙ | ⊙ | ⊙ |
| U % (%) | 0.8 | 1.2 | 1.1 |
| Single yarn size (dtex) | 2.2 | 3.3 | 5.6 |

CAP: cellulose acetate propionate
CDA: cellulose acetate

COMPARATIVE EXAMPLE 5

Polyethylene glycol (PEG1000) having a molecular weight of 1000 and cellulose diacetate having a substitution degree of 2.5 were dissolved in acetone so that the weight ratio was 1:9, and the resultant solution was formed into a sheet by a cast method. The thus-obtained composition had a melt viscosity at 200° C. of 320 Pa·sec, and a melt tension of 120 mN.

As a result of melt spinning of the obtained composition by the same method as Example 9 except that the spinning temperature was 240° C., spinability was low due to excessively high melt viscosity and melt tension, thereby failing to stably form yarns.

COMPARATIVE EXAMPLE 6

Polyethylene glycol (PEG400) having a molecular weight of 400, and cellulose diacetate having a substitution degree of 2.5 were dissolved in acetone so that the weight ratio was 5:5, and the resultant solution was formed into a sheet by a cast method. The thus-obtained composition had a melt viscosity at 200° C. of 20 Pa·sec, and a melt tension of 1 mN.

The obtained composition had low spinability, and thus a single yarn size could not be decreased. Also, the spinning rate could not be increased, and thus spinning was performed at a spinning rate of 50 m/min by the same method as Example 1 was performed. In this example, a nozzle having four holes was used, and the discharge rate was 2.2 g/min. The draft was 4.2.

The spinning tension was as low as 0.05 mN/dtex, and thus filaments were unstable. Furthermore, 12 times of yarn breakage per kg occurred, and distributivity of filaments was low due to an excessively low melt viscosity, thereby producing fibers having U % of 3.8%, and large size irregularity.

extruder type spinning machine, and spun out of a nozzle having 18 holes of 0.25 mm in diameter—0.50 mm in length so that the discharge rate was 3.2 g/min.

The spun filaments were cooled by a chimney wind of 25° C., and were taken up by a first godet roller rotating at 800 m/min without convergence. In this example, the draft was 162.

The spinning tension was a high value of 4 mN/dtex, and five times of yarn breakage per kg occurred. Furthermore, the fibers could not be reeled from the resultant package, and U % could not be measured.

COMPARATIVE EXAMPLE 8

Spinning was performed by the same method as Comparative Example 7 except that an air suction gun was used in place of the first godet roller. The spinning tension was 1.0 mN/dtex.

Since a godet roller was not used, the take-up speed became nonuniform, and the resultant fibers had U % of 2.8 and a large size deviation. Furthermore, yarn breakage occurred three times per kg.

TABLE 5

|  | Comparative Example 5 | Comparative Example 6 | Comparative Example 7 | Comparative Example 8 |
| --- | --- | --- | --- | --- |
| Polymer | CDA + PEG1000 (90:10) | CDA + PEG400 (50:50) | CDA + polylactic acid | CDA + polylactic acid |
| Melt viscosity (Pa · sec) | 320 | 20 | 210 | 210 |
| Melt tension (mN) | 120 | 1 | 42 | 42 |
| Spinning temperature (° C.) | 240 | 210 | 230 | 230 |
| Nozzle hole diameter (mm) | 0.20 | 0.23 | 0.25 | 0.25 |
| Number of nozzle holes | 36 | 4 | 18 | 18 |
| Draft | — | 4.2 | 243 | 243 |
| Spinning rate (m/min) | — | 50 | 800 | 800 (air) |
| Convergence position (m) | — | 2 | No | 3 |
| Spinning tension (mN/dtex) | — | 0.05 | 4 | 1 |
| Winding tension (mN/dtex) | — | 0.1 | 0.15 | 0.15 |
| Yarn making property | X | Δ | Δ | ○ |
| U % (%) | — | 3.8 | Unmeasurable | 2.8 |
| Single yarn size (dtex) | — | 111 | 2.2 | 2.2 |
| Remarks | Incapable of spinning due to no spinability. | Capable of Spinning only at a low rate. Size irregularity | Incapable of reeling | Size irregularity |

CDA: cellulose acetate

COMPARATIVE EXAMPLE 7

30 wt % of L-lactic acid oligomer having a weight average molecular weight of 3,000, and 70 wt % of cellulose diacetate having a substitution degree of 2.5 were prekneaded by a biaxial extruder, and then chipped. The thus-obtained polymer composition had a melt viscosity at 200° C. of 210 Pa·sec, and a melt tension of 42 mN.

The composition was melted at a melting temperature of 230° C. and a spinning temperature of 230° C. by an

EXAMPLE 12

As a result of measurement of the melt viscosity of a composition containing cellulose acetate propionate (ester substitution degree: 2.7, average degree of polymerization: 240), which had been put into an absolute dry condition by vacuum drying at 100° C. for 12 hours, and 12% by weight of a plasticizer (dioctyl adipate (molecular weight 371)), the melt viscosity was 120.1 Pa·sec, and thus the composition exhibited good thermal fluidity. Also, a rate of heating loss was 2.0%, and thus heat resistance was excellent. The melt tension was 12 mN.

The composition was melted at a melter temperature of 230° C. and a pack portion temperature 230° C. by using a monoaxial melt spinning machine, and spun out of a nozzle having 6 holes of 0.23 mm in diameter—0.30 mm in length at a discharge rate of 5.9 g/min. The spun filaments were cooled by a chimney wind of 25° C., and converged with an oiling agent applied thereto. Then, the filaments were taken up by a first godet roller rotating at 450 m/min, and further wound by a winder so that the winding tension was 0.1 cN/dtex, through a second godet roller rotating at the same speed as the first godet roller. The resultant fibers had a strength of 1.0 cN/dtex, an elongation of 38%, a single yarn size of 21.9 dtex, and U % of 0.7%. When a knitted fabric was formed by a cylindrical knitting machine using the resultant fibers, the fibers could be smoothly knitted to obtain a knitted fabric having a soft and dry texture.

EXAMPLE 13

As a result of measurement of the melt viscosity of a composition containing cellulose acetate propionate (ester substitution degree: 2.0, average degree of polymerization: 240), which had been put into an absolute dry condition by vacuum drying at 100° C. for 12 hours, and 9% by weight of a plasticizer (dioctyl adipate (molecular weight 371)), the melt viscosity was 173.6 Pa·sec, and thus the composition exhibited good thermal fluidity. Also, a rate of heating loss was 1.1%, and thus heat resistance was excellent. The melt tension was 15 mN.

The composition was melted at a melter temperature of 240° C. and a pack portion temperature 240° C. by using a monoaxial melt spinning machine, and spun out of a nozzle having 12 holes of 0.23 mm in diameter—0.30 mm in length at a discharge rate of 6.2 g/min. The spun filaments were cooled by a chimney wind of 25° C., and converged with an oiling agent applied thereto. Then, the filaments were taken up by a first godet roller rotating at 1000 m/min, and further wound by a winder so that the winding tension was 0.1 cN/dtex, through a second godet roller rotating at the same speed as the first godet roller. The resultant fibers had a strength of 1.2 cN/dtex, an elongation of 20%, a single yarn size of 5.2 dtex, and U % of 0.9%. When a knitted fabric was formed by a cylindrical knitting machine using the resultant fibers, the fibers could be smoothly knitted to obtain a knitted fabric having a soft and dry texture.

EXAMPLE 14

250 ml of L-lactic acid (produced by Wako Pure Chemical Industries, Ltd., and containing about 10% of $H_2O$) was charged in a 500-ml four-neck flask with a mechanical stirrer, a thermometer, and a cooling trap, and water was distilled off under stirring at 160° C./101080 Pa for 1 hour. Then, condensation polymerization was effected under stirring at 160° C./1330 Pa for 10 hours. The resultant polylactic acid polymer had a weight average molecular weight of 2000.

As a result of measurement of the melt viscosity of a composition containing cellulose acetate propionate (ester substitution degree: 2.5, average degree of polymerization: 140), which had been put into an absolute dry condition by vacuum drying at 100° C. for 12 hours, and 9% by weight of a plasticizer (polylactic acid having a molecular weight of 2000), the melt viscosity was 180 Pa·sec, and thus the composition exhibited good thermal fluidity. Also, a rate of heating loss was 1.3%, and thus heat resistance was excellent. The melt tension was 18 mN.

The composition was melted at a melter temperature of 240° C. and a pack portion temperature 240° C. by using a monoaxial melt spinning machine, and spun out of a nozzle having 24 holes of 0.23 mm in diameter—0.30 mm in length at a discharge rate of 6.1 g/min. The spun filaments were cooled by a chimney wind of 25° C., and converged with an oiling agent applied thereto. Then, the filaments were taken up by a first godet roller rotating at 750 m/min, and further wound by a winder so that the winding tension was 0.1 cN/dtex, through a second godet roller rotating at the same speed as the first godet roller. The resultant fibers had a strength of 0.8 cN/dtex, an elongation of 25%, a single yarn size of 3.4 dtex, and U % of 0.6%. When a knitted fabric was formed by a cylindrical knitting machine using the resultant fibers, the fibers could be smoothly knitted to obtain a knitted fabric having a soft and dry texture.

EXAMPLE 15

As a result of measurement of the melt viscosity of a composition containing cellulose acetate propionate (ester substitution degree: 2.3, average degree of polymerization: 180), which had been put into an absolute dry condition by vacuum drying at 100° C. for 12 hours, and 11% by weight of a plasticizer (glycerin diacetate monolaurate (molecular weight of 358)), the melt viscosity was 152 Pa·sec, and thus the composition exhibited good thermal fluidity. Also, a rate of heating loss was 1.2%, and thus heat resistance was excellent. The melt tension was 17 mN.

The composition was melted at a melter temperature of 245° C. and a pack portion temperature 245° C. by using a monoaxial melt spinning machine, and spun out of a nozzle having 36 holes of 0.23 mm in diameter—0.30 mm in length at a discharge rate of 4.5 g/min. The spun filaments were cooled by a chimney wind of 25° C., and converged with an oiling agent applied thereto. Then, the filaments were taken up by a first godet roller rotating at 500 m/min, and further wound by a winder so that the winding tension was 0.1 cN/dtex, through a second godet roller rotating at the same speed as the first godet roller. The resultant fibers had a strength of 0.8 cN/dtex, an elongation of 35%, a single yarn size of 2.5 dtex, and U % of 0.7%. When a knitted fabric was formed by a cylindrical knitting machine using the resultant fibers, the fibers could be smoothly knitted to obtain a knitted fabric having a soft and dry texture.

EXAMPLE 16

As a result of measurement of the melt viscosity of a composition containing cellulose acetate propionate (ester substitution degree: 2.9, average degree of polymerization: 300), which had been put into an absolute dry condition by vacuum drying at 100° C. for 12 hours, and 10% by weight of a plasticizer (polyethylene glycol having a molecular weight of 4000), the melt viscosity was 185.8 Pa·sec, and thus the composition exhibited good thermal fluidity. Also, a rate of heating loss was 2.0%, and thus heat resistance was excellent. The melt tension was 18 mN.

The composition was melted at a melter temperature of 240° C. and a pack portion temperature 240° C. by using a monoaxial melt spinning machine, and spun out of a nozzle having 18 holes of 0.23 mm in diameter—0.30 mm in length at a discharge rate of 21.6 g/min. The spun filaments were cooled by a chimney wind of 25° C., and converged with an oiling agent applied thereto. Then, the filaments were taken up by a first godet roller rotating at 1200 m/min, and further wound by a winder so that the winding tension was 0.1 cN/dtex, through a second godet roller rotating at the same speed as the first godet roller. The resultant fibers had a strength of 1.3 cN/dtex, an elongation of 25%, a single yarn size of 10.0 dtex, and U % of 1.2%. When a knitted fabric was formed by a cylindrical knitting machine using the resultant fibers, the fibers could be smoothly knitted to obtain a knitted fabric having a soft and dry texture.

The composition was melted at a melter temperature of 230° C. and a pack portion temperature 230° C. by using a monoaxial melt spinning machine, and spun out of a nozzle having 12 holes of 0.23 mm in diameter—0.30 mm in length at a discharge rate of 7.2 g/min. The spun filaments were cooled by a chimney wind of 25° C., and converged with an oiling agent applied thereto. Then, the filaments were taken up by a first godet roller rotating at 500 m/min, and further wound by a winder so that the winding tension was 0.1 cN/dtex, through a second godet roller rotating at the same speed as the first godet roller. The resultant fibers had a strength of 0.4 cN/dtex, an elongation of 55%, a single yarn size of 12.0 dtex, and U % of 3.5%, and thus had a large size deviation. Also, the fibers were tinged with yellow. When a knitted fabric was formed by a cylindrical knitting machine, the obtained knitted fabric had a great feel of sliminess.

TABLE 6

|  | Example 12 | Example 13 | Example 14 | Example 15 | Example 16 |
| --- | --- | --- | --- | --- | --- |
| Main chain compound | CAP | CAP | CAP | CAP | CAP |
| Side chain substitution degree | 2.7 | 2.0 | 2.5 | 2.3 | 2.9 |
| Average degree of polymerization | 240 | 240 | 140 | 180 | 300 |
| Amount of plasticizer added (wt %) | 12 | 9 | 9 | 11 | 10 |
| Rate of heating loss (wt %) | 2.0 | 1.1 | 1.3 | 1.2 | 2 |
| Melt viscosity (Pa · sec) | 120.1 | 173.6 | 180.0 | 152.0 | 185.8 |
| Melt tension (mN) | 12 | 15 | 18 | 17 | 18 |
| Strength (cN/dtex) | 1.0 | 1.2 | 0.8 | 0.8 | 1.3 |
| Elongation (%) | 38 | 20 | 25 | 35 | 25 |
| Single yarn size (dtex) | 21.9 | 5.2 | 3.4 | 2.5 | 10.0 |
| U % (%) | 0.7 | 0.9 | 0.6 | 0.7 | 1.2 |
| Yarn making property | ⊙ | ⊙ | ⊙ | ⊙ | ⊙ |
| Texture | ○ | ○ | ○ | ○ | ○ |

CAP: cellulose acetate propionate

COMPARATIVE EXAMPLE 9

As a result of measurement of the melt viscosity of a composition containing cellulose acetate (ester substitution degree: 2.4, average degree of polymerization: 180), which had been put into an absolute dry condition by vacuum drying at 100° C. for 12 hours, and 10% by weight of a plasticizer (triacetin (molecular weight of 218)), the melt viscosity was 1050 Pa·sec, and thus the composition exhibited poor thermal fluidity. Therefore, fibers could not be formed by melt spinning of the composition.

COMPARATIVE EXAMPLE 10

As a result of measurement of the melt viscosity of a composition containing cellulose acetate propionate (ester substitution degree: 2.74, average degree of polymerization: 240), which had been put into an absolute dry condition by vacuum drying at 100° C. for 12 hours, the melt viscosity was 800 Pa·sec, and thus the composition exhibited poor thermal fluidity. Therefore, fibers could not be formed by melt spinning of the composition.

COMPARATIVE EXAMPLE 11

As a result of measurement of the melt viscosity of a composition containing cellulose acetate propionate (ester substitution degree: 2.7, average degree of polymerization: 240), which had been put into an absolute dry condition by vacuum drying at 100° C. for 12 hours, and 35% by weight of a plasticizer (dioctyl adipate (molecular weight of 371)), the melt viscosity was 35.5 Pa·sec, and thus the composition exhibited excellent thermal fluidity. However, a rate of heating loss was 9.5%, and thus heat resistance was low. The melt tension was 7 mN.

TABLE 7

|  | Comparative Example 9 | Comparative Example 10 | Comparative Example 11 |
| --- | --- | --- | --- |
| Main chain compound | Cellulose acetate | CAP | CAP |
| Side chain substitution degree | 2.4 | 2.7 | 2.7 |
| Average degree of polymerization | 180 | 240 | 240 |
| Amount of plasticizer added (wt %) | 10 | 0 | 35 |
| Rate of heating loss (wt %) | — | — | 9.5 |
| Melt viscosity (Pa · sec) | — | 800 | 35.5 |
| Melt tension (mN) | — | — | 7 |
| Strength (cN/dtex) | — | — | 0.4 |
| Elongation (%) | — | — | 55 |
| Single yarn size (dtex) | — | — | 12 |
| U % (%) | — | — | 3.5 |
| Yarn making property | X | X | Δ |
| Texture | — | — | X |

CAP: cellulose acetate propionate

INDUSTRIAL APPLICABILITY

A thermoplastic cellulose derivative composition having aliphatic polyester graft side chains of the present invention can be melt-spun to provide fiber products by melt spinning.

Fibers comprising the thermoplastic cellulose derivative of the present invention are obtained by melt spinning in spite of the use of the cellulose derivative, and have mechanical properties necessary for passage through higher processing steps, and have a dry and soft texture. Therefore, the fibers can be widely used as clothing fibers and industrial fibers. Also, the fibers are derived from a biomass material, and can thus be suitably used in a field utilizing biodegradability, i.e., used as agricultural materials, forest materials, fisheries materials, geotechnical materials, sanitary materials, daily necessaries, nonwoven fabrics, etc.

A method of producing the fibers comprising the thermoplastic cellulose derivative of the present invention is capable of producing thermoplastic cellulose derivative composition fibers having excellent size uniformity and releasablity without causing yarn breakage and single yarn flow.

What is claimed is:

1. A method of producing a fiber comprising a thermoplastic cellulose composition, wherein the method comprises:
spinning out a thermoplastic cellulose mixed ester composition, having a melt viscosity determined at 200° C. and at a shear rate of 1000 $sec^{-1}$ of 50 to 300 Pa·sec, and a melt tension of 0.1 to 40 mN at the time of take-up at 200° C. and 100 m/min, at a melting temperature of 180 to 240° C.;
converging the fiber with an oiling agent or water applied at a distance of 0.5 to 5 m from the bottom of a nozzle;
taking up a resultant yarn by a godet roller under a spinning tension of 0.1 to 3.0 mN/dtex; and then
winding the yarn on a package.

2. A method of producing a fiber comprising a thermoplastic cellulose mixed ester composition according to claim 1, wherein a spinning draft is 30 to 300.

3. A method of producing a fiber comprising a thermoplastic cellulose mixed ester composition according to claim 1, wherein thermoplastic cellulose mixed ester composition comprises 70 to 98% by weight of a cellulose mixed ester, and 1 to 30% by weight of a plasticizer having a molecular weight of 350 to 20,000.

4. A method of producing a fiber comprising a thermoplastic cellulose mixed ester composition according to claim 1, wherein the fiber has a multifilament form.

5. A melt spun fiber comprising a thermoplastic cellulose mixed ester composition comprising a mixture of 70 to 98% by weight of a cellulose mixed ester, and 1 to 30% by weight of a plasticizer having a molecular weight of 350 to 20,000, and wherein the cellulose mixed ester is at least one selected from the group consisting of cellulose acetate propionate, cellulose acetate butyrate, and cellulose acetate phthalate.

6. A melt spun fiber comprising a thermoplastic cellulose mixed ester composition according to claim 5, wherein the plasticizer is polylactic acid having a weight average molecular weight of 1,000 to 20,000.

7. A melt spun fiber comprising a thermoplastic cellulose mixed ester composition according to claim 5, wherein the plasticizer is polyethylene glycol having a weight average molecular weight of 350 to 20,000.

8. A melt spun fiber comprising a thermoplastic cellulose mixed ester composition according to claim 5, wherein the plasticizer is a glycerin ester having a molecular weight of 350 to 1,000.

9. A melt spun fiber comprising a thermoplastic cellulose mixed ester composition according to claim 5, wherein the content of the plasticizer is 1 to 15% by weight based on the total amount of the composition, and the composition exhibits a rate of heating loss at 200° C. of 5 wt % or less.

10. A melt spun fiber comprising a thermoplastic cellulose mixed ester composition according to claim 5, wherein the fiber has a strength of 0.5 to 4.0 cN/dtex, and an elongation of 2 to 50%.

11. The melt spun fiber comprising a thermoplastic cellulose mixed ester composition according to claim 5, wherein the fiber has a strength of 1.2 to 4.0 cN/dtex.

12. A melt spun fiber comprising a thermoplastic cellulose mixed ester composition comprising a mixture of 70 to 98% by weight of a cellulose mixed ester, and 1 to 30% by weight of a plasticizer having a molecular weight of 350 to 20,000, and wherein the cellulose mixed ester is at least one selected from the group consisting of cellulose acetate propionate, cellulose acetate butyrate, and cellulose acetate phthalate, wherein the fiber has a multifilament form and wherein the filament has a constant size in the axial direction of the fiber, and the fiber has a U % of 0.1 to 2.5%.

* * * * *